United States Patent
Onnerud et al.

(10) Patent No.: US 10,651,521 B2
(45) Date of Patent: *May 12, 2020

(54) LITHIUM ION BATTERY WITH THERMAL RUNAWAY PROTECTION

(71) Applicant: Cadenza Innovation, Inc., Wilton, CT (US)

(72) Inventors: Tord Per Jens Onnerud, Wilton, CT (US); Jay Jie Shi, Acton, MA (US); Ricky Edward Bowersock, Augusta, GA (US); Gary Eugene Gayman, Augusta, GA (US); Jason Peter Street, Augusta, GA (US)

(73) Assignee: Cadenza Innovation, Inc., Wilton, CT (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/312,888

(22) PCT Filed: May 21, 2015

(86) PCT No.: PCT/US2015/031948
§ 371 (c)(1),
(2) Date: Nov. 21, 2016

(87) PCT Pub. No.: WO2015/179625
PCT Pub. Date: Nov. 26, 2015

(65) Prior Publication Data
US 2017/0214103 A1    Jul. 27, 2017

Related U.S. Application Data

(60) Provisional application No. 62/107,845, filed on Jan. 26, 2015, provisional application No. 62/107,630,
(Continued)

(51) Int. Cl.
*H01M 10/658* (2014.01)
*H01M 10/617* (2014.01)
(Continued)

(52) U.S. Cl.
CPC ............ *H01M 10/658* (2015.04); *A62C 3/16* (2013.01); *A62C 99/0018* (2013.01); *C09K 5/18* (2013.01);
(Continued)

(58) Field of Classification Search
CPC ............ H01M 10/658; H01M 10/653; H01M 2/1094; H01M 2/0267; H01M 2200/20;
(Continued)

(56) References Cited

U.S. PATENT DOCUMENTS 4,596,834 A    6/1986    Widener et al.
5,834,120 A *  11/1998  Murray .................. C09K 21/02
                                                        428/404

(Continued)

FOREIGN PATENT DOCUMENTS

CA    20152947765    11/2016
CN    1964126        5/2007
(Continued)

OTHER PUBLICATIONS

Yu et al., Three-Dimensional Porous Amorphous $SnO_2$ Thin Films as Anodes for Li-Ion Batteries, Electrochimica Acta, vol. 54, 7227 (2009).

(Continued)

*Primary Examiner* — Lisa S Park
(74) *Attorney, Agent, or Firm* — McCarter & English, LLP

(57) ABSTRACT

Lithium ion batteries are provided that include materials that provide advantageous endothermic functionalities contributing to the safety and stability of the batteries. The endo-
(Continued)

thermic materials may include a ceramic matrix incorporating an inorganic gas-generating endothermic material. If the temperature of the lithium ion battery rises above a predetermined level, the endothermic materials serve to provide one or more functions to prevent and/or minimize the potential for thermal runaway, e.g., thermal insulation (particularly at high temperatures); (ii) energy absorption; (iii) venting of gases produced, in whole or in part, from endothermic reaction(s) associated with the endothermic materials, (iv) raising total pressure within the battery structure; (v) removal of absorbed heat from the battery system via venting of gases produced during the endothermic reaction(s) associated with the endothermic materials, and/or (vi) dilution of toxic gases (if present) and their safe expulsion from the battery system.

22 Claims, 17 Drawing Sheets

Related U.S. Application Data filed on Jan. 26, 2015, provisional application No. 61/997,082, filed on May 21, 2014.

(51) Int. Cl.

| | | |
|---|---|---|
| H01G 11/06 | (2013.01) | |
| H01G 11/66 | (2013.01) | |
| H01G 11/74 | (2013.01) | |
| H01G 11/78 | (2013.01) | |
| H01M 2/10 | (2006.01) | |
| H01M 2/12 | (2006.01) | |
| A62C 99/00 | (2010.01) | |
| A62C 3/16 | (2006.01) | |
| H01M 2/02 | (2006.01) | |
| H01M 10/653 | (2014.01) | |
| C09K 5/18 | (2006.01) | |
| H01G 11/10 | (2013.01) | |
| H01M 10/0525 | (2010.01) | |
| H01M 10/0587 | (2010.01) | |

(52) U.S. Cl.
CPC .............. *H01G 11/06* (2013.01); *H01G 11/10* (2013.01); *H01G 11/66* (2013.01); *H01G 11/74* (2013.01); *H01G 11/78* (2013.01); *H01M 2/02* (2013.01); *H01M 2/0267* (2013.01); *H01M 2/1016* (2013.01); *H01M 2/1094* (2013.01); *H01M 2/127* (2013.01); *H01M 2/1258* (2013.01); *H01M 10/0525* (2013.01); *H01M 10/0587* (2013.01); *H01M 10/617* (2015.04); *H01M 10/653* (2015.04); *H01M 2200/20* (2013.01); *Y02T 10/7011* (2013.01)

(58) Field of Classification Search
CPC ........... H01M 10/0587; H01M 2/1258; H01M 2/127; H01M 10/0525; H01M 2/1016; H01M 10/617; H01M 2/02; H01G 11/10; H01G 11/78; H01G 11/06; H01G 11/74; H01G 11/66; C09K 5/18; A62C 3/16; A62C 99/0018

See application file for complete search history.

(56) References Cited

U.S. PATENT DOCUMENTS

| | | | |
|---|---|---|---|
| 5,871,861 A | 2/1999 | Hirokou et al. | |
| 6,224,784 B1 * | 5/2001 | Hayes | A21D 8/06 165/10 |
| 6,586,912 B1 | 7/2003 | Tsukamoto et al. | |
| 6,605,382 B2 | 8/2003 | Ruth et al. | |
| 6,653,017 B2 | 11/2003 | Satoh et al. | |
| 7,358,009 B2 | 4/2008 | Johnson et al. | |
| 8,088,509 B2 | 1/2012 | Shen et al. | |
| 8,119,274 B2 | 2/2012 | Park et al. | |
| 8,233,267 B2 | 7/2012 | Miura et al. | |
| 8,273,474 B2 | 9/2012 | Al-Hallaj et al. | |
| 8,568,916 B2 | 10/2013 | Nakai et al. | |
| 9,685,644 B2 * | 6/2017 | Lampe-Onnerud | H01M 2/1077 |
| 2004/0253397 A1 | 12/2004 | Hayes | |
| 2008/0020270 A1 | 1/2008 | Park et al. | |
| 2009/0246640 A1 | 10/2009 | Bak | |
| 2009/0325041 A1 | 12/2009 | Okumura et al. | |
| 2010/0047673 A1 * | 2/2010 | Hirakawa | H01M 2/105 429/54 |
| 2010/0316897 A1 | 12/2010 | Kozuki et al. | |
| 2011/0159341 A1 * | 6/2011 | Iwamoto | H01M 2/1094 429/120 |
| 2011/0223455 A1 | 9/2011 | Kimura et al. | |
| 2012/0003508 A1 | 1/2012 | Narbonne et al. | |
| 2012/0028107 A1 | 2/2012 | Sugita et al. | |
| 2012/0107547 A1 | 5/2012 | Fernando et al. | |
| 2012/0115008 A1 | 5/2012 | Sano et al. | |
| 2013/0011706 A1 * | 1/2013 | Wood | H01M 10/486 429/90 |
| 2013/0071696 A1 | 3/2013 | Kim et al. | |
| 2013/0216887 A1 | 8/2013 | Wayne | |
| 2013/0327312 A1 | 12/2013 | Coffey et al. | |
| 2015/0044530 A1 * | 2/2015 | Koch | H01M 2/1252 429/82 |
| 2017/0098806 A1 | 4/2017 | Bowersock et al. | |

FOREIGN PATENT DOCUMENTS

| | | |
|---|---|---|
| EP | 0132936 | 2/1985 |
| EP | 2077592 | 7/2009 |
| EP | 2015727207 | 11/2016 |
| JP | 2008117756 | 5/2008 |
| JP | 2008169245 A | 7/2008 |
| JP | 2009176455 | 8/2009 |
| JP | 2009289668 A | 12/2009 |
| JP | 2010053196 | 3/2010 |
| JP | 2010061988 A | 3/2010 |
| JP | 2012048905 A | 3/2012 |
| JP | 2012119137 A | 6/2012 |
| JP | 2017513606 | 11/2016 |
| MX | MX/a/2016/015059 | 11/2016 |
| WO | 2007/053990 | 5/2007 |
| WO | 2007/145441 | 12/2007 |
| WO | WO 2011121901 | 10/2011 |
| WO | 2013/122448 | 8/2013 |
| WO | 2013/177138 | 11/2013 |
| WO | 2014/059348 | 4/2014 |
| WO | WO 2014059348 | 4/2014 |
| WO | PCT/US2015/031899 | 5/2015 |
| WO | PCT/US2015/031948 | 5/2015 |
| WO | 2015/179597 | 11/2015 |
| WO | 2015/179625 | 11/2015 |

OTHER PUBLICATIONS

Roth et al., How Electrolytes Influence Battery Safety, The Electrochemical Society Interface, Summer 2012, 45-49.
Golubkov et al., Thermal-Runaway Experiements on Consumer Li-Ion Batteries with Metal-Oxide and Olivin-Type Cathodes, RSC Advances, 4, 3633-3642, 2014.
PCT International Search Report and Written Opinion for PCT/US2015/031899 dated Aug. 26, 2015.
PCT International Search Report and Written Opinion for PCT/US2015/031948 dated Oct. 23, 2015.
U.S. Appl. No. 62/107,845, filed Jan. 26, 2015.
U.S. Appl. No. 62/107,630, filed Jan. 26, 2015.
U.S. Appl. No. 61/997,082, filed May 21, 2014.
Communication pursuant to Article 94(3) EPC for Europe Patent Application No. 15727207.1 dated Dec. 14, 2017.

(56) References Cited

OTHER PUBLICATIONS

Communication pursuant to Article 94(3) EPC Europe for Patent Application No. 15727207.1 dated Jun. 28, 2018.
U.S. Non-Final Office Action dated Aug. 16, 2018 for U.S. Appl. No. 15/312,345.
Response to Office Action for U.S. Appl. No. 15/312,345, dated Nov. 16, 2018.
Chinese Office Action dated Dec. 5, 2018 for Chinese Application 201580031778.1 with English Translation.
U.S. Final Office Action dated Dec. 10, 2018 for U.S. Appl. No. 15/312,345.
Response after Final Office Action for U.S. Appl. No. 15/312,345, dated Feb. 1, 2019.
U.S. Advisory Action dated Feb. 12, 2019 for U.S. Appl. No. 15/312,345.
Response to Advisory Action for U.S. Appl. No. 15/312,345, dated Mar. 7, 2019.
U.S. Notice of Allowance dated Apr. 23, 2019 for U.S. Appl. No. 15/312,345.
U.S. Appl. No. 15/312,345, filed Nov. 18, 2016, U.S. Pat. No. 2017/0098806.

\* cited by examiner

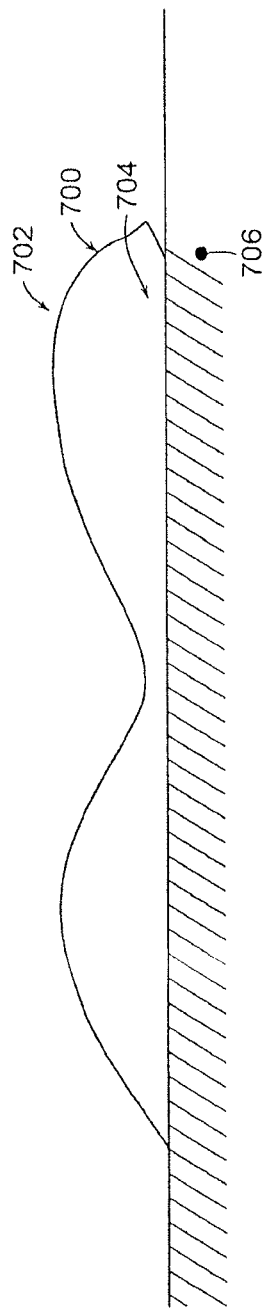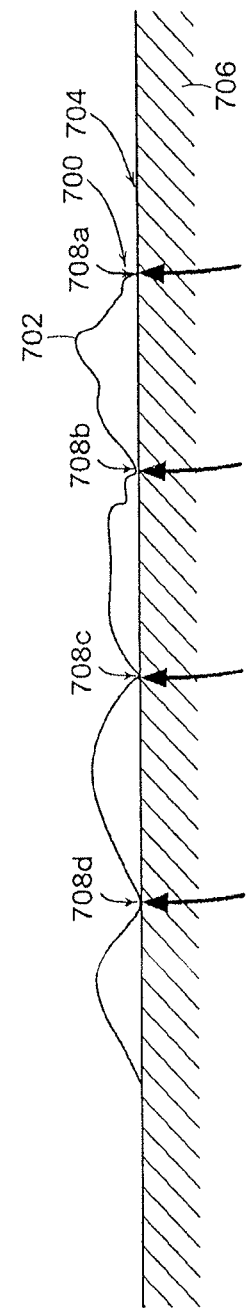

LITHIUM ION BATTERY WITH THERMAL RUNAWAY PROTECTION

CROSS-REFERENCE TO RELATED APPLICATIONS

The present application claims priority benefit to three co-pending provisional patent applications, as follows: (i) U.S. provisional patent application entitled "Electrochemical Cell with Enhanced Safety," filed May 21, 2014, and assigned Ser. No. 61/997,082; (ii) U.S. provisional patent application entitled "Lithium Ion Battery with Thermal Runaway Protection," filed Jan. 26, 2015, and assigned Ser. No. 62/107,630; and (iii) U.S. provisional patent application entitled "Passive Insulation Materials," filed Jan. 26, 2015, and assigned Ser. No. 62/107,845. The entire contents of the foregoing provisional patent applications are incorporated herein by reference.

GOVERNMENT RIGHTS

This invention was made with government support under DE-AR0000392 awarded by the United States Department of Energy. The government has certain rights in the invention.

FIELD OF DISCLOSURE

The present disclosure relates to lithium ion batteries and, more particularly, to multi-core lithium ion batteries having improved safety and reduced manufacturing costs.

BACKGROUND

The demand for electro-chemical power cells, such as Lithium-ion batteries, is ever increasing due to the growth of applications such as electric vehicles and grid storage systems, as well as other multi-cell battery applications, such as electric bikes, uninterrupted power battery systems, and lead acid replacement batteries. It is a requirement for these applications that the energy and power densities are high, but just as important, if not more, are the requirements of low cost manufacturing and increased safety to enable broad commercial adoption. There is further a need to tailor the energy to power ratios of these batteries to that of the application.

For grid storage and electric vehicles, which are large format applications multiple cells connected in series and parallel arrays are required. Suppliers of cells are focused either on large cells, herein defined as more than 10 Ah (Ampere hours) for each single cell, or small cells, herein defined as less than 10 Ah. Large cells, such as prismatic or polymer cells, which contain stacked or laminated electrodes, are made by LG Chemical, AESC, ATL and other vendors. Small cells, such as 18650 or 26650 cylindrical cells, or prismatic cells such as 183765 or 103450 cells and other similar sizes, are made by Sanyo, Panasonic, EoneMoli, Boston-Power, Johnson Controls, Saft, BYD, Gold Peak, and others. These small cells often utilize a jelly roll structure of oblong or cylindrical shape. Some small cells are polymer cells with stacked electrodes, similar to large cells, but of less capacity.

Existing small and large cell batteries have some significant drawbacks. With regard to small cells, such as 18650 cells, they have the disadvantage of typically being constrained by an enclosure or a 'can', which causes limitations for cycle life and calendar life, due in part to mechanical stress or electrolyte starvation. As lithium ion batteries are charged, the electrodes expand. Because of the can, the jelly roll structures of the electrodes are constrained and mechanical stress occurs in the jelly roll structure, which limits its life cycle. As more and more storage capacity is desired, more active anode and cathode materials are being inserted into a can of a given volume which results in further mechanical stresses on the electrode.

Also, the ability to increase the amount of electrolyte in small cells is limited and as the lithium intercalates and de-intercalates, the electrode movement squeezes out the electrolyte from the jelly roll. This causes the electrode to become electrolyte starved, resulting in concentration gradients of lithium ions during power drain, as well as dry-out of the electrodes, causing side reactions and dry regions that block the ion path degrading battery life. To overcome these issues, especially for long life batteries, users have to compromise performance by lowering the state of charge, limiting the available capacity of the cells, or lowering the charge rate.

On the mechanical side, small cells are difficult and costly to assemble into large arrays. Complex welding patterns have to be created to minimize the potential for weld failures. Weld failures result in lowered capacity and potential heating at failed weld connections. The more cells in the array, the higher the failure risk and the lower manufacturing yields. This translates into higher product and warranty costs. There are also potential safety issues associated not only by failure issues in welds and internal shorts, but also in packaging of small cells. Proper packaging of small cells is required to avoid cascading thermal runaway as a result of a failure of one cell. Such packaging results in increased costs.

For large cells, the disadvantages are primarily around safety, low volumetric and gravimetric capacity, and costly manufacturing methods. Large cells having large area electrodes suffer from low manufacturing yields compared to smaller cells. If there is a defect on a large cell electrode, more material is wasted and overall yields are low compared to the manufacturing of a small cell. Take for instance a 50 Ah cell compared to a 5 Ah cell. A defect in the 50 Ah cell results in 10× material loss compared to the 5 Ah cell, even if a defect for both methods of production occurs at the same rate, in term of Ah produced between faults.

A jelly roll typically has one or more pair of tabs connecting to the cathode and anode current collectors, respectively. These are in turn connected to positive and negative terminals. The tabs generally extend a certain distance out from the jelly roll, which generates some void space in a cell, reducing energy density of the battery. Furthermore, for high power applications of Li-ion batteries, such as hybrid electric vehicles (HEV), high current drain is required. In this case, one pair of tabs may not be sufficient to carry the high current loading, as it will result in excessively high temperature at the tabs, causing a safety concern. Various solutions to address these issues have been proposed in prior arts.

U.S. Pat. No. 6,605,382 discloses multiple tabs for cathode and anode. These tabs are connected to positive and negative busbars. Since tabs are generally welded on cathode and anode current collectors, multiple tabs make jelly roll fabrication, particularly the winding process, very complicated, which increases battery cost. In addition, since the areas where the tab is welded onto the current collector has no active materials coating, the multiple tab configuration reduces energy of the battery.

To solve these issues caused by multiple tabs, solutions without tabs in a Li-ion jelly roll have been proposed in the patent literature and are currently used for high power Li-ion and ultra-capacitor cells. The core part of these solutions is to make a jelly roll with non-coated, bare cathode and anode current collector areas at both ends of the jelly roll and weld transition structural components at these ends to collect current.

U.S. Pat. No. 8,568,916 discloses transitional current collector components that take the form of Al and Cu discs. These discs are connected to positive and negative terminals through metal strip leads. Similar concepts have been disclosed and taught in U.S. Pat. Nos. 6,653,017, 8,233,267, US Patent Publn. No. 2010/0316897 and US Patent Publn. No. 2011/0223455. Although these disclosures may eliminate tabs from cathode and anode in a jelly roll, additional means to connect the positive and negative current collectors at the both ends of jelly roll to terminals are required, which still leaves void space in the cell, though less than in the conventional Li-ion cells having tabs. This compromises cell energy density. Furthermore, these solutions are only used in single jelly roll cells. U.S. Pat. No. 6,605,382 discloses a positive busbar where multiple cathode tabs are connected that is directly welded onto a disc which in turn is welded to an aluminum cylinder. This eliminates the need for a can bottom, reducing cell volume and weight. But the disclosure is only used for a multiple tab system.

A number of publications have disclosed means to build a large capacity unit by connecting multiple small cells in parallel. There is a challenge for these solution to properly arrange and configure cell tabs and busbars, and they suffer from low battery energy density, low power density, high cost and low safety. In U.S. Pat. No. 8,088,509, multiple jelly rolls are positioned in individual metal shells. The tabs from jelly rolls are connected to positive and negative busbars. In U.S. Pat. No. 5,871,861, a plurality of single jelly rolls are connected in parallel. Their positive and negative tabs are connected to positive and negative busbars. In WO 2013/122448, a Li-ion cell consisting of multiple jelly roll stacks formed by stacking cathode and anode plates is disclosed. The cathode tabs and anode tabs are connected to positive and negative busbars, respectively. In the foregoing prior art disclosures, multiple jelly rolls formed by winding or electrode stacking have multiple tabs and busbars and are housed in a metal casing.

In PCT/US2013/064654, new types of multi-core Li-ion structures have been disclosed. In one of these structures, a plurality of jelly rolls are positioned in a housing with liners for individual jelly rolls. Tabs from individual jelly rolls are connected to positive and negative busbars.

Another issue for large cells is safety. The energy released in a cell going into thermal runaway is proportional to the amount of electrolyte that resides inside the cell and accessible during a thermal runaway scenario. The larger the cell, the more free space is available for the electrolyte in order to fully saturate the electrode structure. Since the amount of electrolyte per Wh for a large cell typically is greater than a small cell, the large cell battery in general is a more potent system during thermal runaway and therefore less safe. Naturally any thermal runaway will depend on the specific scenario but, in general, the more fuel (electrolyte), the more intense the fire in the case of a catastrophic event. In addition, once a large cell is in thermal runaway mode, the heat produced by the cell can induce a thermal runaway reaction in adjacent cells causing a cascading effect igniting the entire pack with massive destruction to the pack and surrounding equipment and unsafe conditions for users.

For example, various types of cells have been shown to produce temperatures in the region of 600-900° C. in thermal runaway conditions [Andrey W. Golubkov et al, Thermal-runaway experiments on consumer Li-ion batteries with metal-oxide and olivin-type cathodes RSC Adv., 2014, 4, 3633-3642]. Such high temperatures may ignite adjacent combustibles, thereby creating a fire hazard. Elevated temperature may also cause some materials to begin to decompose and generate gas. Gases generated during such events can be toxic and/or flammable, further increasing the hazards associated with uncontrolled thermal runaway events.

Lithium ion cells may use organic electrolytes that have high volatility and flammability. Such electrolytes tend to start breaking down at temperatures starting in the region 150° C. to 200° C. and, in any event, have a significant vapor pressure even before break down starts. Once breakdown commences, the gas mixtures produced (typically a mixture of $Co_2$, $CH_4$, $C_2H_4$, $C_2H_5F$ and others) can ignite. The generation of such gases on breakdown of the electrolyte leads to an increase in pressure and the gases are generally vented to atmosphere; however this venting process is hazardous as the dilution of the gases with air can lead to formation of an explosive fuel-air mixture that, if ignited, can flame back into the cell in question igniting the whole arrangement.

It has been proposed to incorporate flame retardant additives into the electrolyte, or to use inherently non-flammable electrolyte, but this can compromise the efficiency of the lithium ion cell [E. Peter Roth et al., *How Electrolytes Influence Battery Safety*, The Electrochemical Society Interface, Summer 2012, 45-49].

It should be noted that in addition to flammable gases, breakdown may also release toxic gases.

The issue of thermal runaway becomes compounded in batteries that include a plurality of cells, since adjacent cells may absorb enough energy from the event to rise above their designed operating temperatures and so be triggered to enter into thermal runaway. This can result in a chain reaction in which storage devices enter into a cascading series of thermal runaways, as one cell ignites adjacent cells.

To prevent such cascading thermal runaway events from occurring, storage devices may be designed to keep the energy stored sufficiently low, or employ enough insulation between cells to insulate them from thermal events that may occur in an adjacent cell, or a combination thereof. The former severely limits the amount of energy that could potentially be stored in such a device. The latter limits how close cells can be placed and thereby limits the effective energy density.

There are currently a number of different methodologies employed by designers to maximize energy density while guarding against cascading thermal runaway. One method is to employ a cooling mechanism by which energy released during thermal events is actively removed from the affected area and released at another location, typically outside the storage device. This approach is considered an active protection system because its success relies on the function of another system to be effective. Such a system is not fail safe since it needs intervention by another system. Cooling systems also add weight to the total energy storage system, thereby reducing the effectiveness of the storage devices for those applications where they are being used to provide motion (e.g., electric vehicles). The space the cooling system displaces within the storage device may also reduce the potential energy density that could be achieved.

A second approach employed to prevent cascading thermal runaway is to incorporate a sufficient amount of insulation between cells or clusters of cells that the rate of thermal heat transfer during a thermal event is sufficiently low enough to allow the heat to be diffused through the entire thermal mass of the cell, typically by conduction. This approach is considered a passive method and is generally thought to be more desired from a safety vantage. In this approach, the ability of the insulating material to contain the heat, combined with the mass of insulation required dictate the upper limits of the energy density that can be achieved.

A third approach is through the use of phase change materials. These materials undergo an endothermic phase change upon reaching a certain elevated temperature. The endothermic phase change absorbs a portion of the heat being generated and thereby cools the localized region. This approach is also passive in nature and does not rely on outside mechanical systems to function. Typically, for electrical storage devices, these phase change materials rely on hydrocarbon materials, such as waxes and fatty acids for example. These systems are effective at cooling, but are themselves combustible and therefore are not beneficial in preventing thermal runaway once ignition within the storage device does occur.

A fourth method for preventing cascading thermal runaway is through the incorporation of intumescent materials. These materials expand above a specified temperature producing a char that is designed to be lightweight and provide thermal insulation when needed. These materials can be effective in providing insulating benefits, but the expansion of the material must be accounted for in the design of the storage device.

In addition, during thermal runaway of lithium ion cells, the carbonate electrolyte which also contains $LiPF_6$ salt, generally creates a hazardous gas mixture, not only in terms of toxicity but also flammability, as the gas includes $H_2$, $CH_4$, $C_2H_6$, CO, $Co_2$, $O_2$, etc. Such a mixture becomes particularly flammable when venting the cell to atmosphere. Indeed, when a critical oxygen concentration is reached in the mixture, the gas is ignited and can flame back into a cell, igniting the entire arrangement.

When comparing performance parameters of small and large cells relative to each other, it can be found that small cells in general have higher gravimetric (Wh/kg) and volumetric (Wh/L) capacity compared to large cells. It is easier to group multiples of small cells using binning techniques for capacity and impedance and thereby matching the entire distribution of a production run in a more efficient way, compared to large cells. This results in higher manufacturing yields during battery pack mass production. In addition, it is easier to arrange small cells in volumetrically efficient arrays that limit cascading runaway reactions of a battery pack, ignited by for instance an internal short in one cell (one of the most common issues in the field for safety issues). Further, there is a cost advantage of using small cells as production methods are well established at high yield by the industry and failure rates are low. Machinery is readily available and cost has been driven out of the manufacturing system.

On the other hand, the advantage of large cells is the ease of assembly for battery pack OEMs, which can experience a more robust large format structure which often has room for common electromechanical connectors that are easier to use and the apparent fewer cells that enables effective pack manufacturing without having to address the multiple issues and know-how that is required to assemble an array of small cells.

In order to take advantage of the benefits of using small cells to create batteries of a larger size and higher power/energy capability, but with better safety and lower manufacturing costs, as compared to large cells, assemblies of small cells in a multi-core (MC) cell structure have been developed.

One such MC cell structure, developed by BYD Company Ltd., uses an array of MC's integrated into one container made of metal (Aluminum, copper alloy or nickel chromium). This array is described in the following documents: EP 1952475 A0; WO2007/053990; US2009/0142658 A1; CN 1964126A. The BYD structure has only metallic material surrounding the MCs and therefore has the disadvantage during mechanical impact of having sharp objects penetrate into a core and cause a localized short. Since all the cores are in a common container (not in individual cans) where electrolyte is shared among cores, propagation of any individual failure, from manufacturing defects or external abuse, to the other cores and destruction of the MC structure is likely. Such a cell is unsafe.

Methods for preventing thermal runaway in assemblies of multiple electrochemical cells have been described in US2012/0003508 A1. In the MC structure described in this patent application, individual cells are connected in parallel or series, each cell having a jelly roll structure contained within its own can. These individual cells are then inserted into a container which is filled with rigid foam, including fire retardant additives. These safety measures are costly to produce and limit energy density, partly due to the excessive costs of the mitigating materials.

Another MC structure is described in patent applications US2010/0190081 A1 and WO2007/145441 A1, which discloses the use of two or more stacked-type secondary batteries with a plurality of cells that provide two or more voltages by a single battery. In this arrangement, single cells are connected in series within an enclosure and use of a separator. The serial elements only create a cell of higher voltage, but do not solve any safety or cost issues compared to a regularly stacked-type single voltage cell.

These MC type batteries provide certain advantages over large cell batteries; however, they still have certain shortcomings in safety and cost. In addition, from the point of increasing Li-ion battery energy density, reducing cost and improving safety, it is desirable, for lowered cost and higher performance, to (i) eliminate tabs and liners, (ii) integrate both positive current collectors and positive busbars together, (iii) integrate both negative current collectors and negative busbar together and (iv) allow a quick heat depletion at the positive current collector and busbar.

SUMMARY

The present disclosure provides an advantageous multi-core lithium ion battery structure having reduced production costs and improved safety while providing the benefits of a larger size battery, such as ease of assembly of arrays of such batteries and an ability to tailor power to energy ratios. The advantageous systems disclosed herein have applicability in multi-core cell structures and a multi-cell battery modules. It is understood by those skilled in the art that the Li-ion structures described below can also in most cases be used for other electrochemical units using an active core, such as a jelly roll, and an electrolyte. Potential alternative implementations include ultracapacitors, such as those described in U.S. Pat. No. 8,233,267, and nickel metal hydride battery or a wound lead acid battery systems.

In an exemplary embodiment, a lithium ion battery is provided that includes an assembly of multiple cores that are connected to a positive and negative current collector, originating from its anode and cathode electrodes. The lithium ion battery includes a plurality of jelly rolls, positive and negative current collectors, and a metal case. In one embodiment, the jelly roll has at least one bare current collector area welded directly onto a negative or positive bus bar, which is electrically joining multiple jelly rolls. In another embodiment, at least one of the bare current collector areas of the jelly rolls is directly welded onto a surrounding case structure, without using a bus bar for that connection. In this case, the case functions as the bus bar. This can be accomplished by either welding the rolls straight to the case, i.e., a metal can, or by using a sleeve structure, where a bottom fitted bus bar having welded jelly rolls is in turn welded onto the can structure. The bare anode current collector is generally Cu foil and the bare cathode current collector is generally Al foil for a Li-ion battery. The metal plate, which bare electrodes are welded onto, is referred to as the negative bus bar (or NBB), and the bar cathode connected bus bar end in the jelly roll is referred to as the positive bus bar (or PBB). In one embodiment, there are slit openings corresponding to the position of each individual jelly rolls of the NBB to allow an opening for electrolyte filling. This allows for some cases the electrolyte to be contained by the jelly roll itself and no additional electrolyte containing components, such as metal or plastic liners, are needed. In another exemplary embodiment, a single core electrochemical assembly is provided, where the NBB and PBB are welded onto the bare anode and cathode current ends in the jelly roll, respectively. A slit opening may be provided in the NBB. The assembly is inserted into a metal sleeve. The PBB may be welded onto the wall of the metal sleeve as the bottom of the metal case.

According to the present disclosure, exemplary multi-core lithium ion batteries are also described having a sealed enclosure with a support member disposed within the sealed enclosure. The support member includes a plurality of cavities and a plurality of lithium ion core members, disposed within a corresponding one of the plurality of cavities. There are a plurality of cavity liners, each positioned between a corresponding one of the lithium ion core members and a surface of a corresponding one of the cavities. The support member includes a kinetic energy absorbing material and the kinetic energy absorbing material is formed of one of aluminum foam, ceramic, and plastic. There are cavity liners formed of a plastic or aluminum material and the plurality of cavity liners are formed as part of a monolithic liner member. Instead of a plastic liner, also open aluminum cylindrical sleeves or can structures may be used to contain the core members. There is further included an electrolyte contained within each of the cores and the electrolyte includes at least one of a flame retardant, a gas generating agent, and a redox shuttle. Each lithium ion core member includes an anode, a cathode and separator disposed between each anode and cathode. There is further included an electrical connector within said enclosure electrically connecting the core members to an electrical terminal external to the sealed enclosure. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure.

In another aspect of the disclosure, the core members are connected in parallel or they are connected in series. Alternatively, a first set of core members are connected in parallel and a second set of core members are connected in parallel, and the first set of core members is connected in series with the second set of core members. The support member is in the form of a honeycomb structure. The kinetic energy absorbing material includes compressible media. The enclosure includes a wall having a compressible element which, when compressed due to a force impacting the wall, creates an electrical short circuit of the lithium ion battery. The cavities in the support member and their corresponding core members are one of cylindrical, oblong, and prismatic in shape. The at least one of the cavities and its corresponding core member may have different shapes than the other cavities and their corresponding core members.

In another aspect of the disclosure, the at least one of the core members has high power characteristics and at least one of the core members has high energy characteristics. The anodes of the core members are formed of the same material and the cathodes of the core members are formed of the same material. Each separator member may include a ceramic coating and each anode and each cathode may include a ceramic coating. At least one of the core members includes one of an anode and cathode of a different thickness than the thickness of the anodes and cathodes of the other core members. At least one cathode includes at least two out of the Compound A through M group of materials. Each cathode includes a surface modifier. Each anode includes Li metal or one of carbon or graphite. Each anode includes Si. Each core member includes a rolled anode, cathode and separator structure or each core member includes a stacked anode, cathode and separator structure.

In another aspect of this disclosure, the core members have substantially the same electrical capacity. At least one of the core members has a different electrical capacity as compared to the other core members. At least one of the core members is optimized for power storage and at least one of the core members is optimized for energy storage. There is further included a tab for electrically connecting each anode to the first bus bar and a tab for electrically connecting each cathode to the second bus bar, wherein each tab includes a means for interrupting the flow of electrical current through each said tab when a predetermined current has been exceeded. The first bus bar includes a fuse element, proximate each point of interconnection between the anodes to the first bus bar and the second bus bar includes a fuse element proximate each point of interconnection between the cathodes to the second bus bar, for interrupting the flow of electrical current through the fuse elements when a predetermined current has been exceeded. There is further included a protective sleeve surrounding each of the core members and each protective sleeve is disposed outside of the cavity containing its corresponding core member.

In yet another aspect of the disclosure, there are include sensing wires electrically interconnected with the core members configured to enable electrical monitoring and balancing of the core members. The sealed enclosure includes a fire retardant member and the fire retardant member includes a fire retardant mesh material affixed to the exterior of the enclosure.

In another embodiment, there is described a multi-core lithium ion battery that includes a sealed enclosure. A support member is disposed within the sealed enclosure, the support member including a plurality of cavities, wherein the support member includes a kinetic energy absorbing material. There are a plurality of lithium ion core members disposed within a corresponding one of the plurality of cavities. There is further included a plurality of cavity liners, each positioned between a corresponding one of the lithium ion core members and a surface of a corresponding one of the cavities. The cavity liners are formed of a plastic or aluminum material and the plurality of cavity liners are formed as part of a monolithic liner member. The kinetic energy absorbing material is formed of one of aluminum foam, ceramic, and plastic.

In another aspect of the disclosure, there is an electrolyte contained within each of the cores and the electrolyte includes at least one of a flame retardant, a gas generating agent, and a redox shuttle. Each lithium ion core member includes an anode, a cathode and separator disposed between each anode and cathode. There is further included an electrical connector within the enclosure electrically connecting the core members to an electrical terminal external to the sealed enclosure. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure. The core members may be connected in parallel. The core members may be connected in series. A first set of core members may be connected in parallel and a second set of core members may be connected in parallel, and the first set of core members may be connected in series with the second set of core members.

In another aspect, the support member is in the form of a honeycomb structure. The kinetic energy absorbing material includes compressible media. The lithium enclosure includes a wall having a compressible element which, when compressed due to a force impacting the wall, creates an electrical short circuit of the lithium ion battery. The cavities in the support member and their corresponding core members are one of cylindrical, oblong, and prismatic in shape. At least one of the cavities and its corresponding core member may have different shapes as compared to the other cavities and their corresponding core members. At least one of the core members may have high power characteristics and at least one of the core members may have high energy characteristics. The anodes of the core members may be formed of the same material and the cathodes of the core members may be formed of the same material. Each separator member may include a ceramic coating. Each anode and each cathode may include a ceramic coating. At least one of the core members may include one of an anode and cathode of a different thickness as compared to the thickness of the anodes and cathodes of the other core members.

In yet another aspect, at least one cathode includes at least two out of the Compound A through M group of materials. Each cathode may include a surface modifier. Each anode includes Li metal, carbon, graphite or Si. Each core member may include a rolled anode, cathode and separator structure. Each core member may include a stacked anode, cathode and separator structure. The core members may have substantially the same electrical capacity. At least one of the core members may have a different electrical capacity as compared to the other core members. At least one of the core members may be optimized for power storage and at least one of the core members may be optimized for energy storage.

In another aspect of the disclosure, there is further included a tab for electrically connecting each anode to the first bus bar and a tab for electrically connecting each cathode to the second bus bar, wherein each tab includes a means/mechanism/structure for interrupting the flow of electrical current through each said tab when a predetermined current has been exceeded. The first bus bar may include a fuse element, proximate each point of interconnection between the anodes to the first bus bar and a fuse element and/or proximate each point of interconnection between the cathodes to the second bus bar, for interrupting the flow of electrical current through the fuse elements when a predetermined current has been exceeded. There may further be included a protective sleeve surrounding each of the core members and each protective sleeve may be disposed outside of the cavity containing its corresponding core member.

In another embodiment of the disclosure, sensing wires are electrically interconnected with the core members configured to enable electrical monitoring and balancing of the core members. The sealed enclosure may include a fire retardant member and the fire retardant member may include a fire retardant mesh material affixed to the exterior of the enclosure.

In another embodiment, a multi-core lithium ion battery is described which includes a sealed enclosure, with a lithium ion cell region and a shared atmosphere region in the interior of the enclosure. A support member is disposed within the lithium ion cell region of the sealed enclosure and the support member includes a plurality of cavities, each cavity having an end open to the shared atmosphere region. A plurality of lithium ion core members are provided, each having an anode and a cathode, disposed within a corresponding one of the plurality of cavities, wherein the anode and the cathode are exposed to the shared atmosphere region by way of the open end of the cavity and the anode and the cathode are substantially surrounded by the cavity along their lengths. The support member may include a kinetic energy absorbing material. The kinetic energy absorbing material is formed of one of aluminum foam, ceramic and plastic.

In another aspect, there are a plurality of cavity liners, each positioned between a corresponding one of the lithium ion core members and a surface of a corresponding one of the cavities. The cavity liners may be formed of a plastic or aluminum material. The pluralities of cavity liners may be formed as part of a monolithic liner member. An electrolyte is contained within each of the cores and the electrolyte may include at least one of a flame retardant, a gas generating agent, and a redox shuttle. Each lithium ion core member includes an anode, a cathode and separator disposed between each anode and cathode. There is an electrical connector within the enclosure electrically connecting the core members to an electrical terminal external to the sealed enclosure. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure.

In yet another aspect, the core members are connected in parallel or the core members are connected in series. Alternatively, a first set of core members are connected in parallel and a second set of core members are connected in parallel, and the first set of core members is connected in series with the second set of core members.

In another embodiment, a lithium ion battery is described and includes a sealed enclosure and at least one lithium ion core member disposed within the sealed enclosure. The lithium ion core member include an anode and a cathode, wherein the cathode includes at least two compounds selected from the group of Compounds A through M. There may be only one lithium ion core member. The sealed enclosure may be a polymer bag or the sealed enclosure may be a metal canister. Each cathode may include at least two compounds selected from group of compounds B, C, D, E, F, G, L and M and may further include a surface modifier. Each cathode may include at least two compounds selected from group of Compounds B, D, F, G, and L. The battery may be charged to a voltage higher than 4.2V. Each anode may include one of carbon and graphite. Each anode may include Si.

In yet another embodiment, a lithium ion battery is described having a sealed enclosure and at least one lithium ion core member disposed within the sealed enclosure. The lithium ion core member includes an anode and a cathode. An electrical connector within the enclosure electrically connects the at least one core member to an electrical terminal external to the sealed enclosure; wherein the electrical connector includes a means/mechanism/structure for interrupting the flow of electrical current through the electrical connector when a predetermined current has been exceeded. The electrical connector includes two bus bars, the first bus bar interconnecting the anodes of the core members to a positive terminal member of the terminal external to the enclosure, and the second bus bar interconnecting the cathodes of the core members to a negative terminal member of the terminal external to the enclosure. The electrical connector may further include a tab for electrically connecting each anode to the first bus bar tab and/or for electrically connecting each cathode to the second bus bar, wherein each tab includes a means/mechanism/structure for interrupting the flow of electrical current through each tab when a predetermined current has been exceeded. The first bus bar may include a fuse element, proximate each point of interconnection between the anodes to the first bus bar, and the second bus bar may include a fuse element, proximate each point of interconnection between the cathodes to the second bus bar, for interrupting the flow of electrical current through the fuse elements when a predetermined current has been exceeded.

The present disclosure further provides lithium ion batteries that include, inter alia, materials that provide advantageous endothermic functionalities that contribute to the safety and/or stability of the batteries, e.g., by managing heat/temperature conditions and reducing the likelihood and/or magnitude of potential thermal runaway conditions. In exemplary implementations of the present disclosure, the endothermic materials/systems include a ceramic matrix that incorporates an inorganic gas-generating endothermic material. The disclosed endothermic materials/systems may be incorporated into the lithium battery in various ways and at various levels, as described in greater detail below.

In use, the disclosed endothermic materials/systems operate such that if the temperature rises above a predetermined level, e.g., a maximum level associated with normal operation, the endothermic materials/systems serve to provide one or more functions for the purposes of preventing and/or minimizing the potential for thermal runaway. For example, the disclosed endothermic materials/systems may advantageously provide one or more of the following functionalities: (i) thermal insulation (particularly at high temperatures); (ii) energy absorption; (iii) venting of gases produced, in whole or in part, from endothermic reaction(s) associated with the endothermic materials/systems, (iv) raising total pressure within the battery structure; (v) removal of absorbed heat from the battery system via venting of gases produced during the endothermic reaction(s) associated with the endothermic materials/systems, and/or (vi) dilution of toxic gases (if present) and their safe expulsion (in whole or in part) from the battery system. It is further noted that the vent gases associated with the endothermic reaction(s) dilute the electrolyte gases to provide an opportunity to postpone or eliminate the ignition point and/or flammability associated with the electrolyte gases.

The thermal insulating characteristics of the disclosed endothermic materials/systems are advantageous in their combination of properties at different stages of their application to lithium ion battery systems. In the as-made state, the endothermic materials/systems provide thermal insulation during small temperature rises or during the initial segments of a thermal event. At these relatively low temperatures, the insulation functionality serves to contain heat generation while allowing limited conduction to slowly diffuse the thermal energy to the whole of the thermal mass. At these low temperatures, the endothermic materials/systems materials are selected and/or designed not to undergo any endothermic gas-generating reactions. This provides a window to allow for temperature excursions without causing any permanent damage to the insulation and/or lithium ion battery as a whole. For lithium ion type storage devices, the general range associated as excursions or low-level rises are between 60° C. and 200° C. Through the selection of inorganic endothermic materials/systems that resist endothermic reaction in the noted temperature range, lithium ion batteries may be provided that initiate a second endothermic function at a desired elevated temperature. Thus, according to the present disclosure, it is generally desired that endothermic reaction(s) associated with the disclosed endothermic materials/systems are first initiated in temperature ranges of from 60° C. to significantly above 200° C. Exemplary endothermic materials/systems for use according t the present disclosure include, but are not limited to:

TABLE 1

| Mineral | Chemical Formula | Approximate onset of Decomposition (° C.) |
| --- | --- | --- |
| Nesquehonite | $MgCO_3 \cdot 3H_2O$ | 70-100 |
| Gypsum | $CaSO_4 \cdot 2H_2O$ | 60-130 |
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 |

These endothermic materials typically contain hydroxyl or hydrous components, possibly in combination with other carbonates or sulphates. Alternative materials include non-hydrous carbonates, sulphates and phosphates. A common example would be sodium bicarbonate which decomposes above 50° C. to give sodium carbonate, carbon dioxide and water. If a thermal event associated with a lithium ion battery does result in a temperature rise above the activation temperature for endothermic reaction(s) of the selected endothermic gas-generating material, then the disclosed endothermic materials/systems material will advantageously begin absorbing thermal energy and thereby provide both cooling as well as thermal insulation to the lithium ion battery system. The amount of energy absorption possible generally depends on the amount and type of endothermic gas-generating material incorporated into the formula, as well as the overall design/positioning of the endothermic materials/systems relative to the source of energy generation within the lithium ion battery. The exact amount of addition and type(s) of endothermic materials/systems for a given application are selected to work in concert with the insulating material such that the heat absorbed is sufficient to allow the insulating material to conduct the remaining entrapped heat to the whole of the thermal mass of the energy storage device/lithium ion battery. By distributing the heat to the whole thermal mass in a controlled manner, the temperature of the adjacent cells can be kept below the critical decomposition or ignition temperatures. However, if the heat flow through the insulating material is too large, i.e., energy conduction exceeds a threshold level, then adjacent cells will reach decomposition or ignition temperatures before the mass as a whole can dissipate the stored heat.

With these parameters in mind, the insulating materials associated with the present disclosure are designed and/or selected to be thermally stable against excessive shrinkage across the entire temperature range of a typical thermal event for lithium ion battery systems, which can reach temperatures in excess of 900° C. This insulation-related requirement is in contrast to many insulation materials that are based on low melting glass fibers, carbon fibers, or fillers which shrink extensively and even ignite at temperatures above 300° C. This insulation-related requirement also distinguishes the insulation functionality disclosed herein from intumescent materials, since the presently disclosed materials do not require design of device components to withstand expansion pressure. Thus, unlike other energy storage insulation systems using phase change materials, the endothermic materials/systems of the present disclosure are not organic and hence do not combust when exposed to oxygen at elevated temperatures. Moreover, the evolution of gas by the disclosed endothermic materials/systems, with its dual purpose of removing heat and diluting any toxic gases from the energy storage devices/lithium ion battery system, is particularly advantageous in controlling and/or avoiding thermal runaway conditions.

According to exemplary embodiments, the disclosed endothermic materials/systems desirably provide mechanical strength and stability to the energy storage device/lithium ion battery in which they are used. The disclosed endothermic materials/systems may have a high porosity, i.e., a porosity that allows the material to be slightly compressible. This can be of benefit during assembly because parts can be press fit together, resulting in a very tightly held package. This in turn provides vibrational and shock resistance desired for automotive, aerospace and industrial environments.

Of note, the mechanical properties of the disclosed endothermic materials/systems generally change if a thermal event occurs of sufficient magnitude that endothermic reaction(s) are initiated. For example, the evolution of gases associated with the endothermic reaction(s) may reduce the mechanical ability of the endothermic materials/systems to maintain the initial assembled pressure. However, energy storage devices/lithium ion batteries that experience thermal events of this magnitude will generally no longer be fit-for-service and, therefore, the change in mechanical properties can be accepted for most applications. According to exemplary implementations of the present disclosure, the evolution of gases associated with endothermic reaction(s) leaves behind a porous insulating matrix.

The gases produced by the disclosed endothermic gas-generating endothermic materials/systems include (but not limited to) $Co_2$, $H_2O$ and/or combinations thereof. The evolution of these gases provides for a series of subsequent and/or associated functions. First, the generation of gases between an upper normal operating temperature and a higher threshold temperature above which the energy storage device/lithium ion battery is liable to uncontrolled discharge/thermal runaway can advantageously function as a means of forcing a venting system for the energy storage device/lithium ion battery to open.

The generation of the gases may serve to partially dilute any toxic and/or corrosive vapors generated during a thermal event. Once the venting system activates, the released gases also serve to carry out heat energy as they exit out of the device through the venting system. The generation of gases by the disclosed endothermic materials/systems also helps to force any toxic gases out of the energy storage device/lithium ion battery through the venting system. In addition, by diluting any gases formed during thermal runaway, the potential for ignition of the gases is reduced.

The endothermic materials/systems may be incorporated and/or implemented as part of energy storage devices/lithium ion battery systems in various ways and at various levels. For example, the disclosed endothermic materials/systems may be incorporated through processes such as dry pressing, vacuum forming, infiltration and direct injection. Moreover, the disclosed endothermic materials/systems may be positioned in one or more locations within an energy storage device/lithium ion battery so as to provide the desired temperature/energy control functions.

Additional advantageous features, functions and implementations of the disclosed energy storage systems and methods will be apparent from the description of exemplary embodiments described below, particularly when read in conjunction with the appended figures.

BRIEF DESCRIPTION OF THE FIGURES

The systems and methods of the present disclosure will be better understood on reading the description which follows, given solely by way of non-limiting example and made with reference to the drawings in which:

FIG. 7A is a cross-sectional view of an egg-box shaped wall of an enclosure according to the present disclosure.

FIG. 7B is a cross-sectional view of an egg-box shaped wall of an enclosure according to the present disclosure during a mechanical impact on the wall.

DESCRIPTION OF EXEMPLARY EMBODIMENT(S)

Figure 1A:
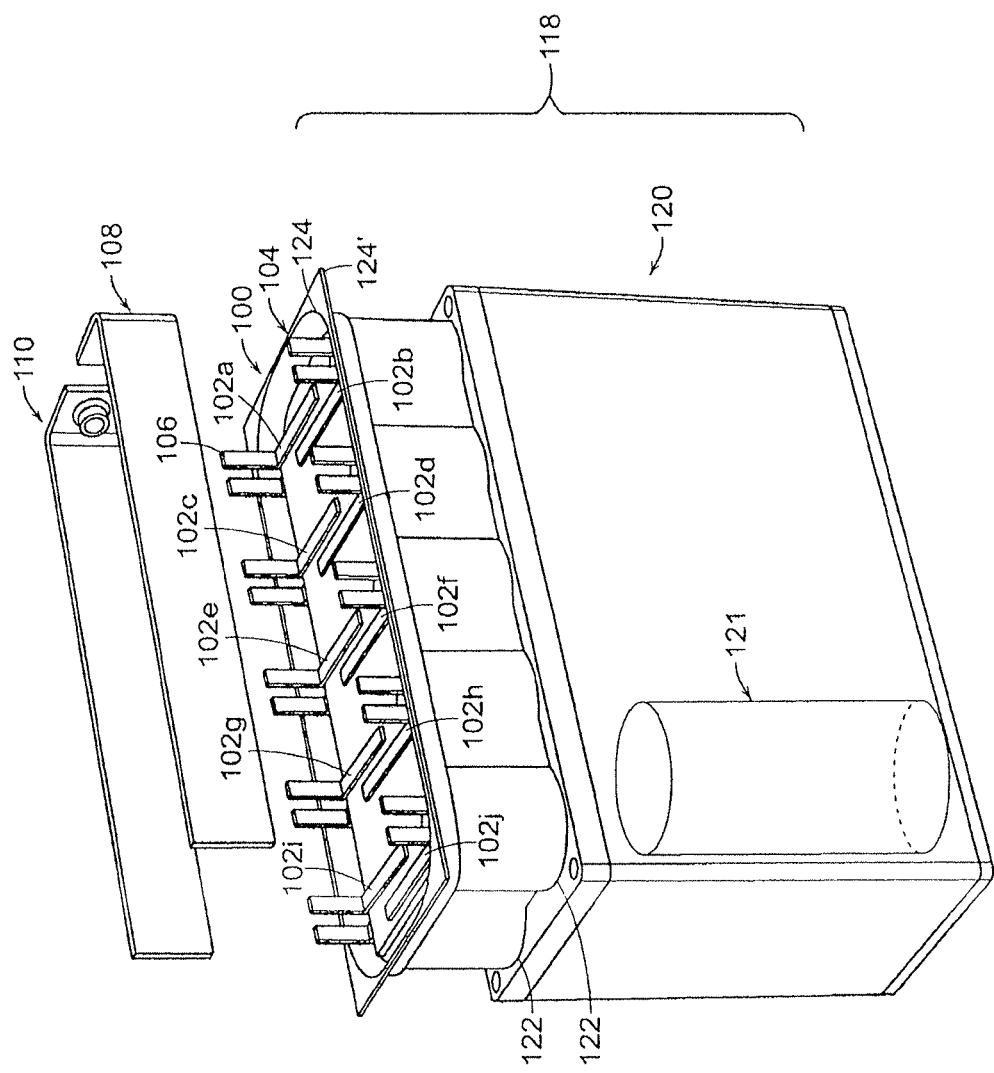
FIG. 1A is an exploded perspective view of a multicore, lithium ion battery according to the present disclosure.
Figure 1B:
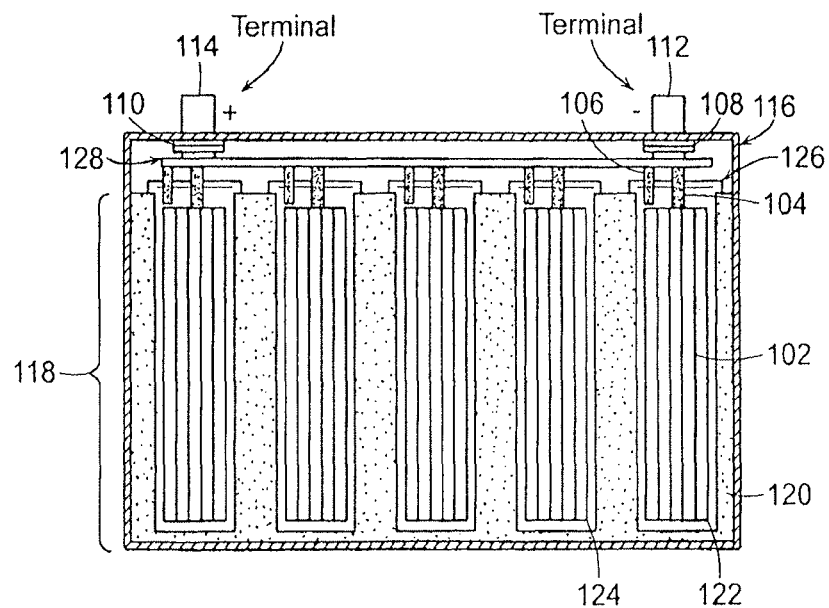
FIG. 1B is a cross-sectional view of a multicore, lithium ion battery according to the present disclosure.

In FIGS. 1A and 1B, there is shown a multi-core (MC) array 100 of lithium ion core members 102*a-j*, having a jelly roll cores structure and a cylindrical shape. Various shapes and size ion core members may be used in connection with the present disclosure and certain exemplary shapes and sizes are described below. There is a set of electrically conductive tabs 104 connected to the cathodes of each of the core members 102*a-j* and a set of electrically conductive tabs 106 connected to the anodes of each of the core members 102*a-j*. Tabs 104 are also connected to cathode bus bar 108 and tabs 106 are connected to anode bus bar 110. The cathode tabs 104 and the anode tabs 106 are welded to the bus bars 108, 110 using spot welding or laser welding techniques. The bus bars 108, 110 are interconnected to negative terminal 112 and positive terminal 114, respectively, on the exterior of the MC enclosure 116. In this configuration, all of the ion core members 102*a-j* are connected in parallel, but they may be connected in series or in other configurations as will be apparent to those skilled in the art.

MC enclosure 116, FIG. 1B, is hermetically sealed. The support structure 120, which can be a part of the enclosure 116 or a separate part is constructed so that ion core members can be housed with adequate separation, so that limited expansion can take place during charge and discharge reactions thereby preventing mechanical interaction of the individual ion core members. Preferably enclosure 116 is made of plastic or ceramic materials, but can also be made of metal. If a metal is used, exposed steel is not preferred, and any steel container would need to be coated with an inert metal such as nickel. Preferred metals are Aluminum, Nickel or other inert metal to the chemicals used. Many types of plastic and ceramic as long as they are inert to the chemical and electrochemical environment. Examples of plastics and ceramics are polypropylene, polyethylene, alumina, zirconia. Enclosure 116 can include a fire retardant mesh affixed to the exterior of the enclosure for the purpose of preventing fire from reaching the interior of the enclosure.

Within enclosure 116, in lithium ion core region 118, is an electrically insulated support member 120 which can be made of ceramic, plastic, such as polypropylene, polyethylene, or other materials, such as aluminum foam. Support member 120 must be sufficiently deformable/compressible so as to protect the core members from damage when an impact occurs. In addition it is desired that the thermal conductivity be tailored to the application by means of dispersing heat during charge and discharge of the battery, creating a uniform temperature distribution, and by means of diverging heat during a catastrophic failure, such as an internal short causing thermal runaway of one core member. Proper heat dispersing properties would limit the chance of cascading runaway between cores. The support member can also be absorptive to electrolyte, which could be constrained in the support member, should it be expelled during abuse of the core member.

A deformable and kinetic energy absorbing support member 120 is desirable in exemplary implementations, as it distributes impact loads over larger areas reducing the amount of local deformation at each core member 102*a-j*, thereby reducing the likelihood of an electric short circuit. Examples of kinetic energy absorbing materials are foams, such as aluminum foam, plastic foams, porous ceramic structures, honeycomb structures, or other open structures, fiber filled resins, and phenolic materials. An example of fiber fillers for plastic and resin materials could be glass fiber or carbon fibers. Examples of aluminum containing energy absorbers are aluminum foam, having open or closed pores, aluminum honeycomb structures, and engineered material such as the Altucore™ and CrashLite™ materials. As the support member collapses during impact, crash or other mechanical abuse, it is important that the cores, as much as possible, are protected from penetration as to avoid internal mechanically induced shorts. This creates a safer structure.

Figure 1C:
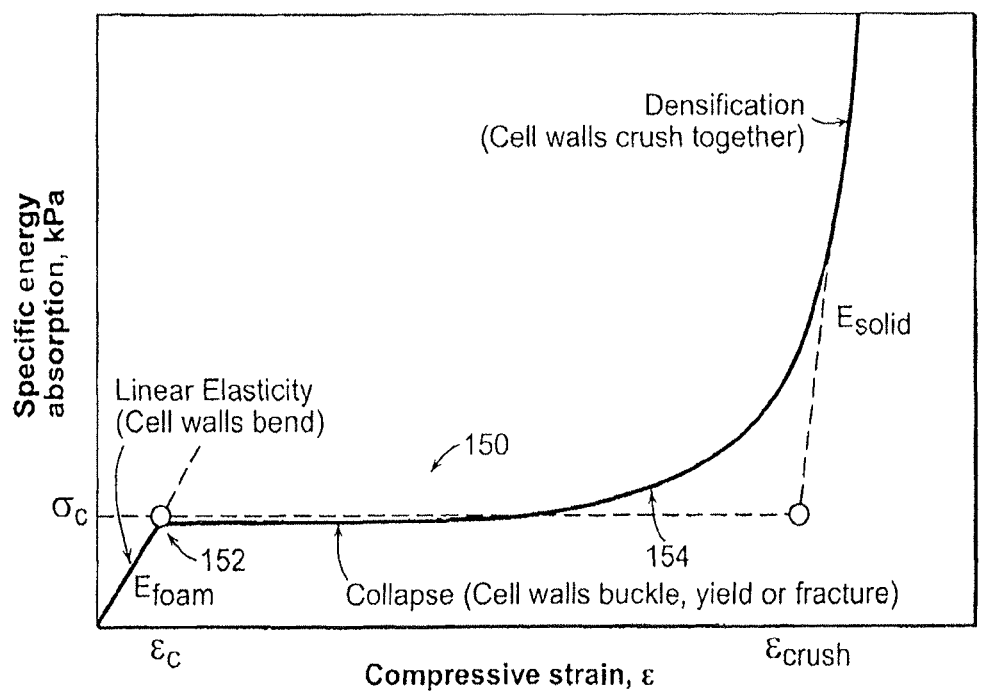
FIG. 1C is a stress-strain plot of an exemplary energy absorbing material of a support member according to the present disclosure.

Energy absorbers are a class of materials that generally absorb kinetic mechanical energy by compressing or deflecting at a relatively constant stress over an extended distance, and not rebounding. Springs perform a somewhat similar function, but they rebound, hence they are energy storage devices, not energy absorbers. Once an applied stress exceeds the "crush plateau", see 150 of FIG. 1C, of the kinetic energy absorber material, the energy absorber will begin to compress at a fairly constant stress out to about 50-70% of strain of the material. This extended section of the stress/strain curve defines the behavior of an ideal energy absorber. In this zone, the area under the curve represents the product of stress×strain, or "work". In an actual block of energy absorber material of a finite size, such as support member 120, this would be represented as:

$$Force \times Displacement$$

Recognizing that

Force (pounds)×Displacement (feet)=Work (foot pounds)

and

Work (foot pounds)=kinetic energy (foot pounds)

The work that would be done to compress support member 120 is equivalent to the kinetic energy of a mass that might impact support member 120. When designed with appropriate thickness and compression strength, as will be apparent to one skilled in the art, support member 120 may be made of kinetic energy absorbing material could absorb all of the kinetic energy of an impact on the battery, for example in a crash of an electric vehicle. Most importantly, the cargo in the support members 120, i.e. the lithium ion core members 102a-j, would never see a force higher than the crush strength of the material (defined below). Thus, by absorbing the energy of the impacting mass over a controlled distance with a constant force, the protected structure, i.e. the lithium ion core members 102a-j, would not have to endure a concentrated high-energy/high force impact that would occur if the mass impacted the structure directly, with potentially catastrophic results.

When a load is applied to a structure made of an energy absorbing material, it will initially yield elastically in accord with the Young's modulus equation. However, at approximately 4-6% of strain, 152 of FIG. 1C, in this particular example of Al foam, depending on the structure size it will begin to buckle and collapse continuously at a relatively constant stress. Depending upon the initial relative density of the material, this constant collapse will proceed to approximately 50-70% of strain, 154 of FIG. 1C, for this Al foam material. At that point, the stress/strain curve will begin to rise as the energy absorbing material enters the "densification" phase. The point in the stress/strain curve where the material transitions from the elastic to plastic deformation phase defines the "crush strength" of the material.

The long, relatively flat section of the curve between the 4-6% transition and 50-70% of strain (covering approximately 45-65% of the possible strain values of the material), called the "crush plateau". This unique characteristic of kinetic energy absorbing materials makes them very useful to absorb the kinetic energy of an impacting mass while protecting the cargo being carried.

To further protect the core member, a cylindrical material made of metal, ceramic or plastic may be added as a sleeve 121, FIG. 1A, around the core structure. This sleeve can either be added directly surrounding the individual cores, on the outside of the liner material, or be applied the inside of the cavities structures in the support member. This prevents sharp objects from penetrating the cores. Although only one sleeve is shown in the figure it will be readily understood that sleeves would be included for each core member.

Figure 1D:
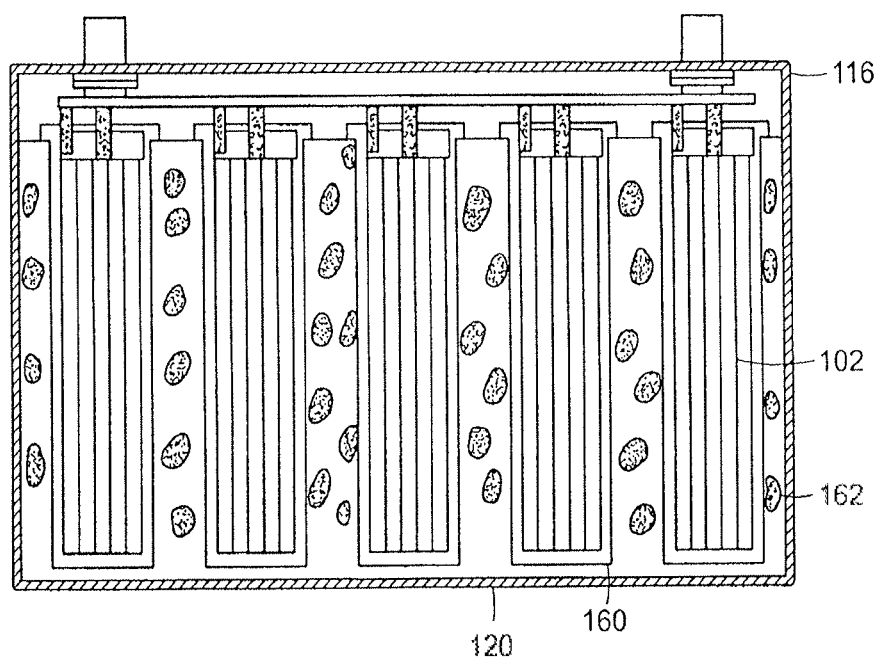
FIG. 1D is a cross-sectional view of another embodiment of a multicore, lithium ion battery according to the present disclosure.

Support member 120 could alternatively be designed with open regions 160, as shown in FIG. 1D, which contain filling materials 162. Examples of filling materials are irregularly or regularly shaped media, which can be hollow or dense. Examples of hollow media are metal, ceramic or plastic spheres, which can be made compressible at various pressure forces and with the purpose of functioning as an energy absorber for crash protection. Specific examples are aluminum hollow spheres, ceramic grinding media of alumina or zirconia, and polymer hollow spheres.

Support member 120 may also be optimized to transfer heat rapidly throughout the support member and distribute it evenly throughout the battery or limit heat exposure between cores, should one core experience thermal runaway during abuse. Besides greater safety, this will increase battery life by limiting maximum operating temperatures and enable the battery to have no, or passive, thermal management. Most importantly, the thermal characteristics of support member 120 help to prevent failure propagation from a failed core member to other core members due to the optimized heat transfer properties of the material and the ability to disrupt flame propagation. Since the material is also absorptive, it can absorb leaking electrolyte into the material which can help reduce the severity of a catastrophic failure.

Support member 120 increases overall safety of the MC battery by a) allowing the distribution of the ion core members 102a-j to optimize the battery for both safety and high energy density, b) arresting rapid thermal propagation ion core members 102a-j, while simultaneously allowing cooling, c) providing a protective crash and impact absorbing structure for ion core members 102a-j and the reactive chemicals, and d) use of a widely recognized fire proof material through flame arrest.

Cylindrical cavities 122 are formed in support member 120 for receiving the lithium ion core members 102a-i, one core per cavity. In this configuration, the cylindrical cavities 122 have openings 126 with a diameter that is slightly larger than those of the lithium ion core members 102. Openings 126 face and are exposed to shared atmosphere region 128 within enclosure 116. Without having individual smaller enclosures (such as a can or polymer bag that hermetically provides a seal between the active core members), the anodes/cathodes of the core members are also directly exposed to the shared environment region 128. Not only does the elimination of the canned core members reduce manufacturing costs, it also increases safety. In the event of a failure of a core member and a resulting fire, the gasses expelled are able to occupy the shared environment region 128, which provides significantly more volume than would be available in a typical individually 'canned' core member. With the canned core member pressure build up, an explosion is more likely than with the present invention, which provides a greater volume for the gases to occupy and therefore reduced pressure build up. In addition, a can typically ruptures at much higher pressures than the structure of the invention, resulting in a milder failure mode with the present invention.

Within each cavity 122 is placed a thin cavity liner 124, which is positioned between support member 120 and lithium ion core members 102a-i. Typically, all cavity liners (in this case 10 corresponding to the number of cavities) are formed as part of a monolithic cavity liner member 124'. The liner is preferably made out of polypropylene, polyethylene, or any other plastic that is chemically inert to electrolyte. The liner may also be made of a ceramic or metal material, although these are at higher cost and non-preferred. However, in the case where the support member is electrically conductive, the liner must be electrically insulating so as to electrically isolate the core members from the support member. The cavity liners are important for multiple reasons. First, they are moisture and electrolyte impermeable. Secondly, they may contain flame retarding agents, which can quench a fire and thirdly, they allow a readily sealable plastic material to contain the electrolyte within a hermetic seal.

During manufacturing, cavities 122 can be simultaneously filled with electrolyte and then simultaneously formed and graded for capacity during the continued manufacturing process. The forming process consist of charging the cell to a constant voltage, typically 4.2V and then letting the cell rest at this potential for 12-48 hours. The capacity grading takes place during a charge/discharge process, where the cell is fully discharged to a lower voltage, such as 2.5V, then charged to highest voltage, typically in a range of 4.2-4.5V, and subsequently discharged again, upon which the capacity is recorded. Multiple charge/discharge cycles may be needed to obtain an accurate capacity grading, due to inefficiencies in the charge/discharge process.

The cavity liner enables a precise and consistent amount of electrolyte to be introduced to each core member, due to its snug fit with the core. One way to accomplish the filling is with through holes in enclosure 116 which can then be filled and sealed after the electrolyte has been introduced to the cavities and processed. A jelly roll type core member having about 3 Ah capacity will need about 4-8 g of electrolyte, depending on density and surrounding porous material. Electrolyte filling is done so that entire jelly roll is equally wetted throughout the roll with no dry areas allowed. It is preferred that each core member has the equivalent amount of electrolyte from core to core, with a variation within 0.5 g, and even more preferred within 0.1 g and yet even more preferred within 0.05 g. The variation adjusts with the total amount electrolyte and is typically less than 5% or even more preferred <1% of the total amount of electrolyte per core. Placing the assembly in a vacuum helps with this filling process and is crucial for full and equal wetting of the electrodes.

The size, spacing, shape and number of cavities 122 in support member 120 can be adjusted and optimized to achieve the desired operating characteristics for the battery while still achieving the safety features described above, such as mitigating failure propagation between/among core members 102.

Figure 2:
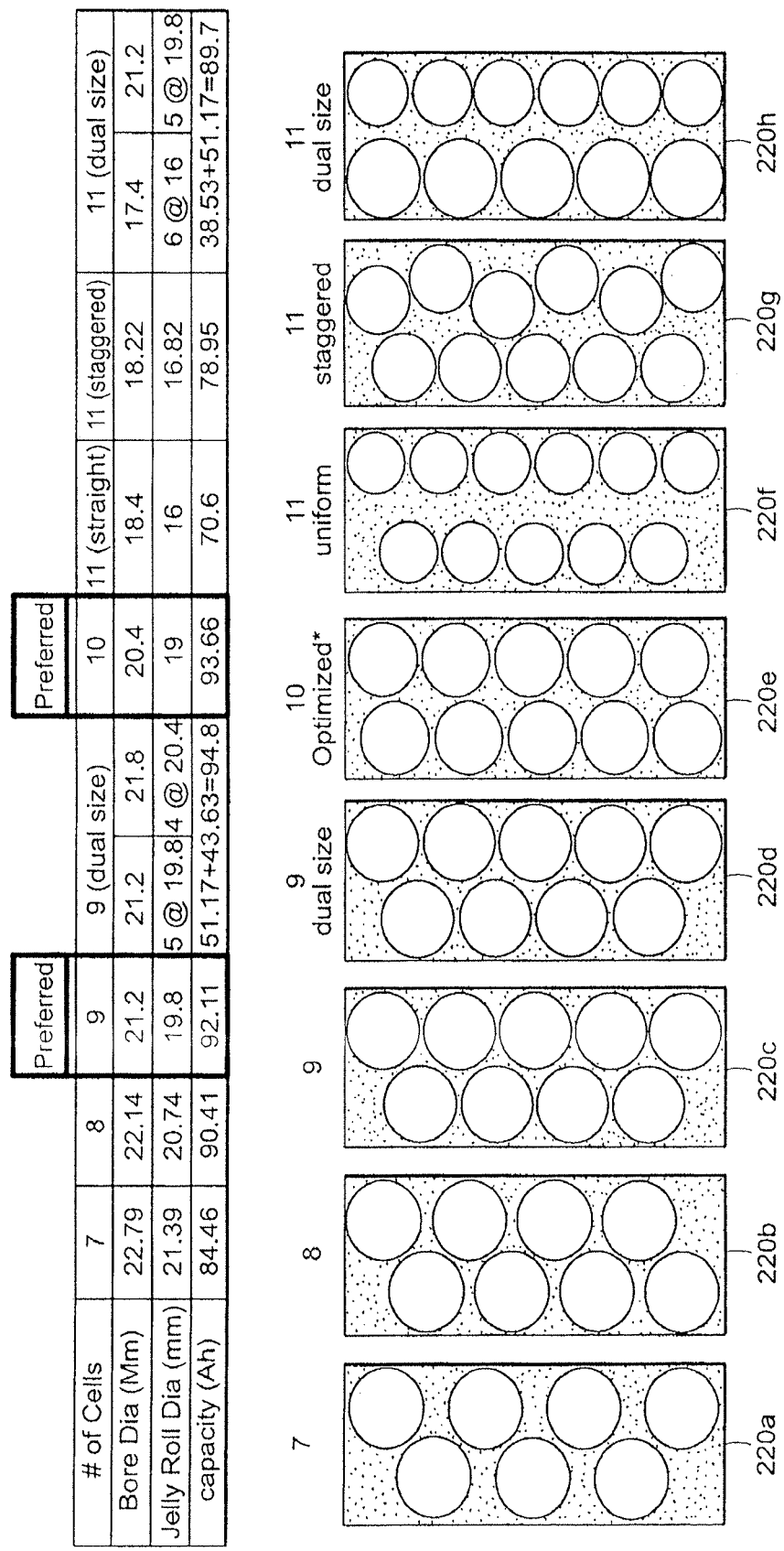
FIG. 2 is a top down view of a plurality of support member configurations according to the present disclosure.

As shown in FIG. 2, support members 220a-h may have different numbers of cavities, preferably ranging from 7 to 11, and different configurations, including support members having different size cavities as in the case of support members 220d and 220h. The number of cavities is always more than 2 and is not particularly limited on the upper end, other than by geometry of the support member and jelly roll size. A practical number of cavities are typically between 2 and 30. The cavities can be uniformly distributed, as in support member 220f, or they can be staggered, as in the case of support member 220g. Also shown in FIG. 2 are the cavity diameters and diameter of the core member that can be inserted into the cavities for each of the support members 220a-h depicted. In addition, the capacity in Ampere hours (Ah) for each configuration is shown.

Figure 3:
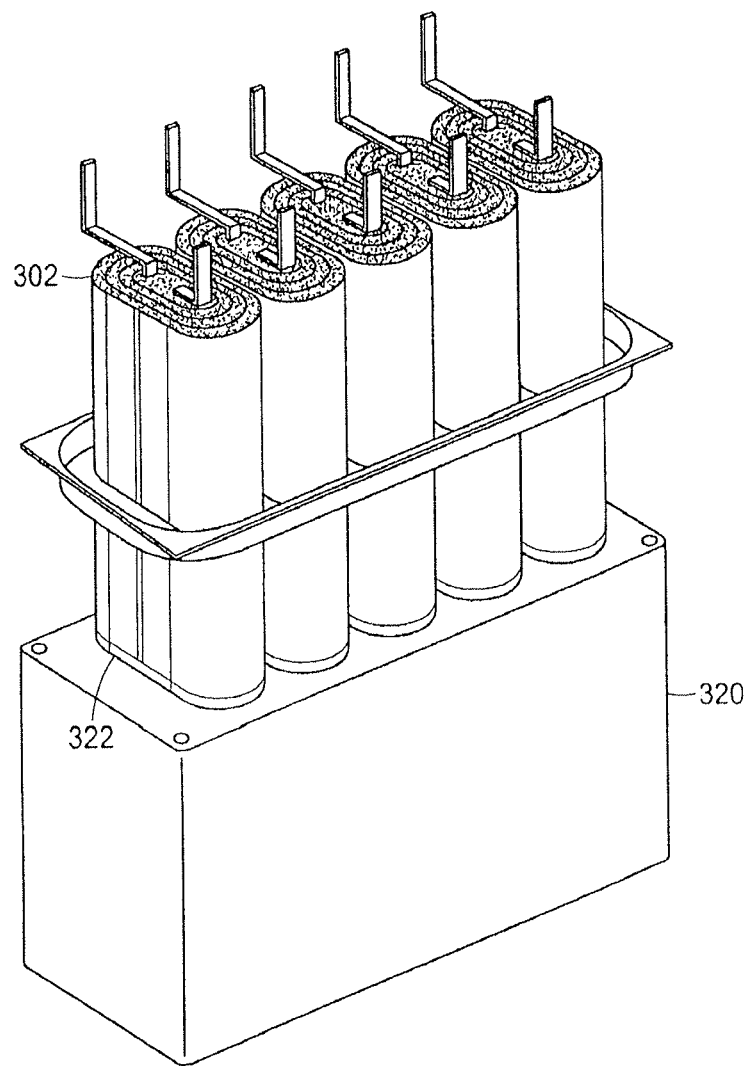
FIG. 3 is perspective view of another embodiment of a multicore, lithium ion battery according to the present disclosure.
Figure 4:
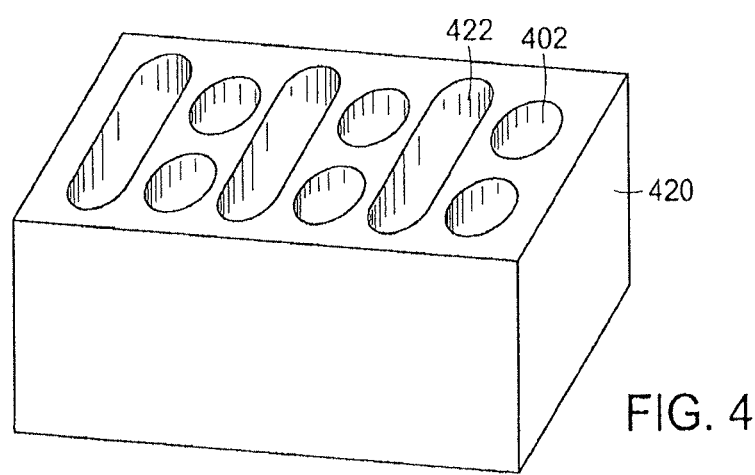
FIG. 4 is perspective view of another embodiment of a support member having mixed oblong and cylindrical cavities according to the present disclosure.

Different shaped cavities and core members can be used as well. As shown in FIG. 3, support member 320 includes cavities 322 having an oblong shape for receiving like shaped core members 302. In FIG. 4, support member 420 has a mixture of oblong cavities 422 and cylindrical cavities 402 for receiving like shaped core members (not shown).

Figure 5:
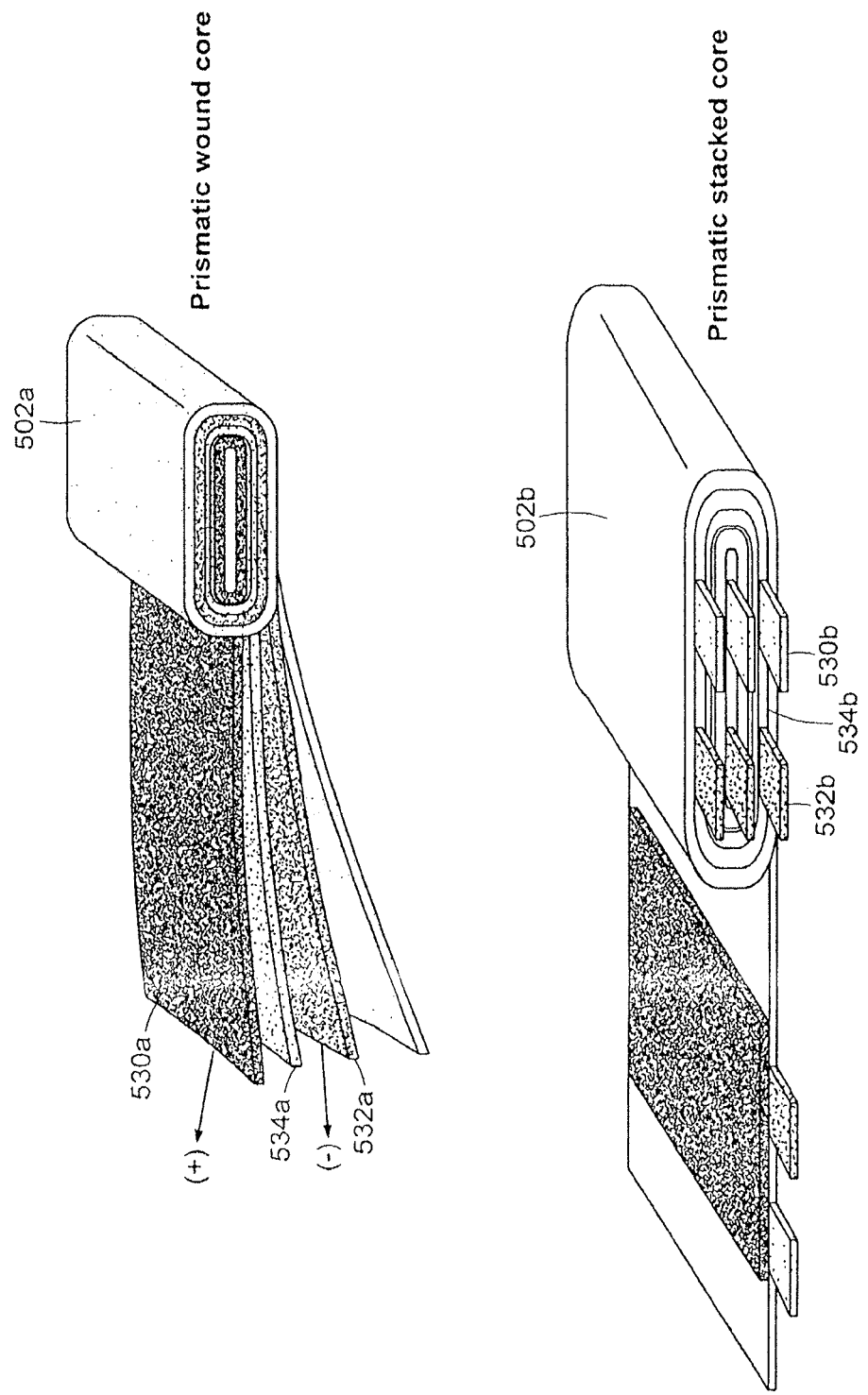
FIG. 5 is perspective view of prismatic wound and stacked core members according to the present disclosure.

In FIG. 5, another shape of core member 502a, suitable for this invention is shown. This is a jelly roll structure, but with a prismatic shape rather than cylindrical or oblong as previously described. The core member includes anode 530a, cathode 532a and electrically insulating separator 534a. Although not depicted in the previous figures each core member includes a separator between the anodes and the cathodes. Core member 502b is also prismatic in shape, however, a stacked construction is used, includes anode 530b, cathode 532b and separator 534b.

Thus far the core members have been shown electrically connected in a parallel, however, they may be connected in series or in a combination of parallel and series connections. As shown in FIG. 6, there is support member 620 (made of aluminum foam or polymer foam) together with inserted jelly rolls core members 602. For clarity, the tabs to the core members connecting to the bus bars are not shown, but present. Negative battery terminal connector 640 is electrically connected to the lower voltage bus bar 642. Positive battery terminal connector 644 is electrically connected to the high voltage bus bar 646. Adjacent block bus bars 648 and 650 connect each the core members in their respective rows in parallel. Each bus bar 642, 644, 648 and 650 has a complementary bus bar on the opposite side of the core member, which is not shown. Every parallel bus bar is individually connected in series through three connecting bars, 652, allowing a serial electrical path. Sensing cables 654a-654e are positioned on each electrical unique point, allowing detection of voltage levels across each of the parallel linked jelly roll voltage points in a serial system. These wires can also be used for providing balancing current to keep core members at the same state of charge during charge and discharge and are connected to a feed through contact 656. Those skilled in the art of cell balancing systems will realize the purpose of such connections within a unit of the invention having serially connected cores.

Figure 6A:
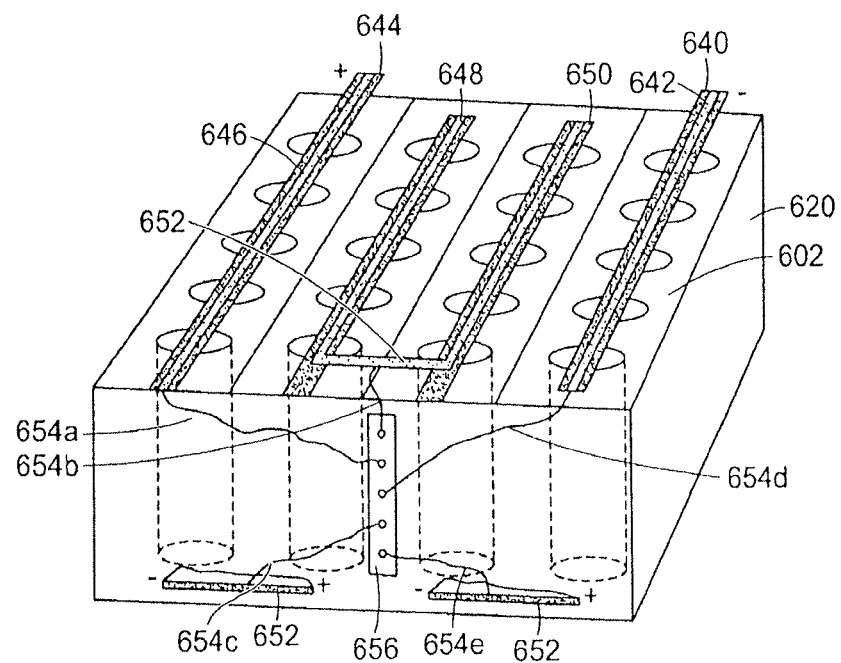
FIG. 6A depicts a parallel/series connected multi-core lithium ion battery according to the present disclosure.
Figure 6B:
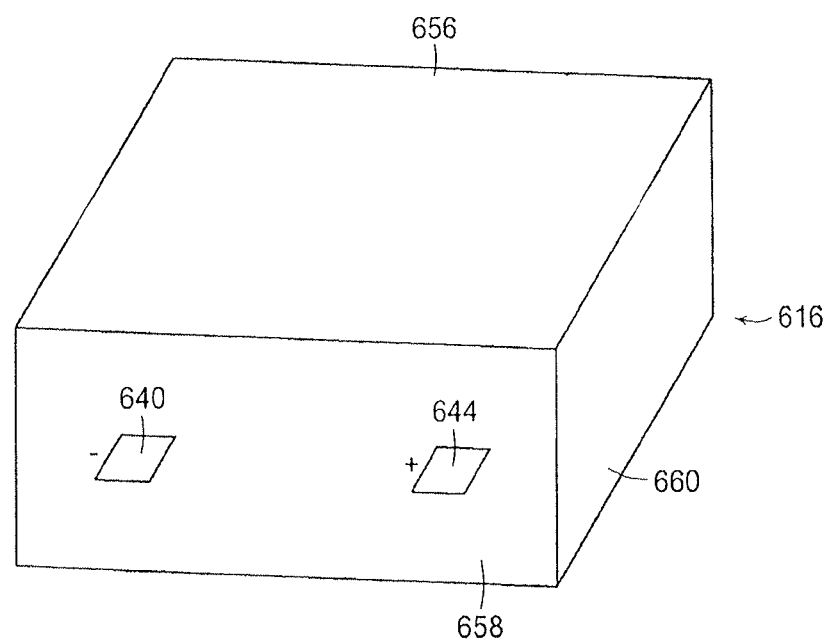
FIG. 6B is a perspective view of a parallel/series connected multi-core lithium ion battery according to the present disclosure.

FIG. 6B shows an enclosure 616 that houses the support member 320. Enclosure 616 consist of a plastic lid 658 and a box 660 that are hermetically sealed through ultrasonic welding. At the end of enclosure 616 opposite the side of lid 658 is the feed through sensing contact 656. Extending from lid 658 are negative battery terminal connector 640 and positive battery terminal connector 644. It can be understood that various arrangements as to the position of the connectors sensing contact can be achieved by those skilled in the art and also that different serial or parallel arrangement cells can be used for the purpose of the invention.

In the case of a metal lid it is closed with welding methods, such as laser welding, and in the case of plastics, adhesives (glues) can be used, or thermal or ultrasonic weld methods can be used, or any combination thereof. This provides for a properly sealed MC battery. Jelly rolls are connected in parallel or series inside the enclosure.

All feedthroughs, sensing, power, pressure, etc., needs to be hermetically sealed. The hermetical seals should withstand internal pressure of in excess or equal to about 1 atm and also vacuum, preferably more than 1.2 atm. A vent can also be housed on the container, set at a lower internal pressure than the seal allows.

Another way of providing balancing and sensing ability is to have individual connectors that provide an external lead from each of the positive and negative terminals of individual core members allowing connectors external to the container to connect with each of the individual core members. The balancing circuit detects imbalance in voltage or state-of-charge of the serial cells and would provide means of passive of active balancing known to those skilled in the art. The connecting leads are separate from the terminals providing means of leading current from the cells for the purpose of providing power from the battery and typically only used when cells are connected in series within one container. The sensing leads can optionally be fused outside the container, for avoidance of running power currents through the individual jelly rolls through the sensing circuit.

Enclosure 116, 616 may be configured with egg box shaped wall 700, FIG. 7A, such that upon mechanical impact on the enclosure the MC battery can be short circuited externally of the enclosure. Egg box shaped portion 702 of the wall 700, made out of aluminum, contacts a plate of non-conductive material 704, made of polyethylene plastic (prior to impact). A second plate 706, which is made out of aluminum or other conductive material, is located below the plastic plate 704. The egg box shaped material 702 is connected to either the negative or the positive pole of the MC battery and the other conductive plate 706 is connected to the opposite pole. Upon impact, nail penetration, or non-normal pressure on the wall, such as in a crash, the egg box shaped wall 702 compresses so that the plastic plate 704 is penetrated and makes contact with conductive plate 706 external contact points 708a-d, FIG. 7B, creating an external electrical short circuit in the MC battery.

The individual core members are typically connected by means of an internal bus bars, as described above. Sometimes the bus bar common connector can be a wire or plastic coated wire. It can also be a solid metal, such as copper, aluminum or nickel. This bus bar connects multiple core members in series or parallel and has the capability of transferring currents in the multi-core member structure to a connector, allowing an external connection to the multi-core array. In the case of external bus bar individual feed through connectors through the enclosure from each jelly roll would be needed.

Whether internal or external bus bars are used, they can be constructed to provide a fuse between the core members. This can be accomplished in a variety of ways, including creating areas where the cross section of the bus bar is limited to only carry a certain electrical current or by limiting the tab size, which connects the core member to the bus bar. The bus bar or tabs can be constructed in one stamped out piece, or other metal forming technique, or by using a second part that connects the divisions of the bus bars with a fuse arrangement. For instance, if two rectangular cross section areas of copper bus bars are used, where anode and cathode tabs of 10 core members are connected to each of by the bus bar, each bus bar having a cross sectional surface area of 10 mm$^2$, at least one area on the bus bar can be fabricated to have a reduced surface area compared to the rest of the bus bar. This provides a position where fusing occurs and current carrying capability is limited. This fuse area can be at one or more points of the bus bar, preferably between each core member, but most effective in the case of many cells at the mid-point. If an external short were to occur, this fuse would limit the heating of the core members and potentially avoid thermal runaway. Also in the case of internal shorts in a core member, either due to manufacturing defects or due to external penetration during an abuse event, such as a nail, that penetrates into the core members causing an internal short to the cell, this fuse arrangement can limit the amount of current that is transferred to the internal short by shutting of the malfunctioning core to the other parallel cores.

Empty space inside the enclosure can be filled with shock absorbing materials, such as foam or other structure that allows less impact to the core members, thereby further reducing the risk of internal shorts. This ruggedization can also provide means of shifting the self-vibration frequency of the internal content to the enclosure, providing increased tolerance to shock and vibration and mechanical life. The filler material should preferably contain fire retardant materials that would allow extinguishing of any fire that could arise during thermal runaway of the cell or melt during the same thermal runaway, thereby taking up excess heat and limit the heating of a cell. This provides for increased safety in the case of catastrophic event. Examples of fire retardants can be found in the open engineering literature and handbooks, such as Polyurethanes Handbook published by Hanser Gardner Publications or as described in U.S. Pat. No. 5,198,473. Besides polyurethane foam also epoxy foams or glass fiber wool and similar non-chemically or electrochemically active materials, can be used as filler materials in empty spaces inside the enclosure. In particular, hollow or dense spheres or irregularly shaped particulates made of plastic, metal or ceramic can be used as low cost fillers. In the case of hollow spheres, these would provide additional means for energy absorption during a crash scenario of the multi core cell. In a special case, the support member is aluminum foam. In another special case, the support member is dense aluminum foam between 10-25% of aluminum density. In yet another special case, the pores in the aluminum foam has an average diameter that is less than 1 mm. In further exemplary implementations, endothermic materials/systems, as described in greater detail below, may be advantageously incorporated into or otherwise associated with the empty spaces inside the enclosure.

For the case when the MC battery has only core members arranged in parallel, the core members may contain one or more core members that are optimized for power and one or more core members that are optimized for energy. In another special case, the MC battery may have some core members with anode or cathode using certain materials and other core members utilizing anodes and cathodes using different materials. In yet another special case, the anode or cathode, may have different thickness electrodes. Any combination of having varying electrode thickness, cathode or anode active material, or electrode formulation may be combined in a parallel string, with the objective of tailoring the energy to power ratio of the battery. Some core members may be configured to withstand rapid power pulses, while other core members may be optimized for high energy storage thus providing a battery that can handle high power pulses, while having high energy content. It is important however that the core members have chemistry that is matched electrochemically, so as to provide chemical stability in the voltage window for the chemistry chosen.

For instance, a $LiCoO_2$ cathode can be matched with a $LiNi_{0.8}Co_{0.15}Al_{0.05}O_2$ cathode, as long as an upper potential of 4.2V is used and a lower potential of about 2V to 2.5V, however, as potential goes above 4.2V, to for instance 4.3V, for instance a magnesium doped $LiCoO_2$ material should not be matched with an NCA material, as the NCA material degrades at the higher voltages. However, in the latter example, the two materials can be mixed as long as the upper potential is limited to 4.2V. It is an objective of the invention to use blended cathode materials in the correct voltage range and the inventor has found certain combinations that are particularly useful for high energy or high power, elaborated on later in the description.

The power and energy optimization can take place by either adjusting the formulation of the electrode, such as using higher degree of conductive additive for increased electrical conductivity, or by using different thickness electrodes. Additionally the energy cores can have one set of active materials (cathode and anode) and the power cores another type of materials. When using this method it is preferred that the materials have matched voltage range, such as 2.5-4.2V or in case of high voltage combinations 2.5V-4.5V, so as to avoid decomposition. Upper voltage is characterized as above 4.2V and is typically below 5V per isolated core member in a Li-ion multi-core battery.

The following are descriptions of anode, cathode, separator, and electrolyte which can be used in connection with this invention.

Anode

The anode of these core members are generally those commonly found in Li-ion or Li polymer batteries and described in the literature, such as graphite, doped carbon, hard carbon, amorphous carbon, Silicon (such as silicon nano particles or Si pillars or dispersed silicon with carbon), tin, tin alloys, $Cu_6Sn_5$, Li, deposited Li onto metal foil substrates, Si with Li, mixed in Li metal powder in graphite, lithium titanate, and any mixtures thereof. Anode suppliers include, for example, Morgan Carbon, Hitachi Chemical, Nippon Carbon, BTR Energy, 0.11-E Chemical, Shanshan, Taiwan Steel, Osaka Gas, Conoco, FMC Lithium, Mitsubishi Chemical. The invention is not limited to any particular anode compound.

Cathode

The cathode used for the jelly rolls are generally those that are standard for the industry and also some new high voltage mixtures, which are described in more detail below. These new cathodes can be used in MC structures or in single cell batteries wherein the anode/cathode structure is contained in a sealed metal canister or a sealed polymer bag. Due to the richness of cathode materials available to the industry, the classes of materials as to each materials group herein are referred to as "Compounds"; each compound can have a range of compositions and are grouped due to similarity in crystal structure, chemical composition, voltage range suitability, or materials composition and gradient changes. Examples of suitable individual materials are $Li_xCoO_2$ (referred to as Compound A), $Li_xM_zCo_wO_2$ (Compound B, where M is selected from Mg, Ti, and Al and partly substituting Co or Li in the crystal lattice and added in the range Z=0-5%, typically W is close to 1, suitable for charge above 4.2V), $Li_x Ni_aMn_bCo_cO_2$ (in particular the combinations of about a=⅓, b=⅓, c=⅓ (Compound C) and a=0.5, b=0.3, c=0.2 (Compound D), and Mg substituted compounds thereof (both grouped under Compound E)).

Another example is $Li_xNi_dCo_eAl_fO_2$ (Compound F) and its Mg substituted derivative $Li_xMg_yNi_dCo_eAl_fO_2$ (Compound G), where in a special case d=0.8, e=0.15, f=0.05, but d, e, and f can vary with several percent, y ranges between 0 and 0.05. Yet another example of individual cathode materials are $Li_xFePO_4$ (Compound H), $Li_xCoPO_4$ (Compound I), $LiMnPO_4$ (Compound J), and $Li_xMn_2O_4$ (Compound K). In all of these compounds, an excess of lithium is typically found (x>1), but X can vary from about 0.9 to 1.1. A class of materials that is particularly suited for high voltages, possessing high capacity when charged above 4.2V, are the so-called layered-layered materials described for instance by Thackeray et al. in U.S. Pat. No. 7,358,009 and commercially available from BASF and TODA (Compound L).

The compound initially described by Thackeray can be made stable at voltages above 4.2V. Some of these cathodes are stable at high voltages, above 4.2V (the standard highest voltage using graphite as anode) and those materials can be preferably mixed. Although one of the above materials can be used in the invention, it is preferred to mix two or more of the materials compounds selected from B, C, D, E, F, G, I, J, and L. In particular, two or more component mixture of the Compounds B, D, F, G, and L is preferred. For very high energy density configurations, a mixture of (B and L) or (B and G) or (G and L) are most beneficial and when these are made as thin electrodes also high power can be achieved. The thin (power) and thick (energy) electrodes can enter into core members for tailoring of energy to power ratio, while having same suitable voltage range and chemistry.

A particular new cathode, the so-called, core shell gradient (CSG) material (referred to as Compound M), has a different composition at its core compared to its shell. For instance, Ecopro (website www.ecopro.co.kr or (http://ecopro.co.kr/xe/?mid=emenu31, as of date 2010-10-01) or Patent Publn. No. PCT/KR2007/001729, which describes such a Compound M material in product literature as "CSG material" (Core Shell Gradient) as $xLi[Ni_{0.8}Co_{0.1}Mn_{0.1}]O_2$ $(1-x)Li[Ni_{0.46}Co_{0.23}Mn_{0.31}]O_2$ and another M-type compound is also described by Y-K Sun in ElectrochimicaActa Vol. 55, Issue 28, p. 8621-8627, and third description of M-type compound can be found by in Nature Materials 8 (2009) p. 320-324 (article by YK Sun et al), which describes a CSG material of similar composition but formula Bulk=Li $(Ni_{0.8}Co_{0.1}Mn_{0.1}O_2$, gradient concentration=$Li(Ni_{0.8+x}Co_{0.1+y}Mn_{0.1+z}$, where 0≤x≤0.34, 0≤y≤0.13, and 0≤z≤0.21; and surface layer=$Li(Ni_{0.46}Co_{0.23}Mn_{0.31})O_2$. A further description can be found in WO 2012/011785A2, describing the manufacturing of variants of Compound M described as $Li_{x1}[Ni_{1-y1-z1-w}Co_{y1}Mn_{z1}M_{w1}]O_2$ (where, in the above formula, 0.9≤x1≤1.3, 0.1≤y1≤0.3, 0.0≤z1≤0.3, 0≤w1≤0.1, and M is at least one metal selected from Mg, Zn, Ca, Sr, Cu, Zr, P, Fe, Al, Ga, In, Cr, Ge, and Sn); and an exterior portion including the compound of $Li_{x2}[Ni_{1-y2-z2-w2}Co_{y2}Mn_{z2}M_{w2}]O_2$ (where, in the exterior formula, 0.9≤x2≤1+z2, 0y2≤0.33, 0≤z2≤0.5, 0≤w2≤0.1 and M is at least one metal selected from Mg, Zn, Ca, Sr, Cu, Zr, P, Fe, Al, Ga, In, Cr, Ge, and Sn). All four ranges of variants of compound M are incorporated herein by reference for Compound M to be used in various aspects of the present disclosure.

It is preferred that the M compound may further have Li content that could be at about 1, but vary within a few percent and that the Li or Ni/Mn/Co compounds can be substituted with Mg, Al and first row transition metals, by optimization, and that it is preferred to blend one or more of these M compounds as described above with Compounds B, C, D, E, F, G, L for use in Li-ion batteries. It is likely that the core Compound M material can contain up to 90% nickel and as low as 5% Cobalt and up to 40% Mn, and the gradient would then go from one of these boundary compositions to as low as 10% Ni, 90% Cobalt, and 50% Mn.

In general, high power can be achieved by using thin electrodes of the compounds or blends described within this invention for anode and cathodes. A thick electrode is typically considered to be above 60 μm of thickness up to about 200 μm, when measuring the electrode coating layer thickness from the aluminum foil, while thinner electrodes (i.e. less than 60 μm) are better for high power Li-ion battery configurations. Typically for high power, more carbon black additive is used in the electrode formulations to make it more electrically conductive. Cathode compounds can be bought from several materials suppliers, such as Umicore, BASF, TODA Kogyo, Ecopro, Nichia, MGL, Shanshan, and Mitsubishi Chemical. Compound M, is available from Ecopro and described in their product literature as CSG material (such as $xLi[Ni_{0.8}Co_{0.1}Mn_{0.1}]O_2(1-x)Li[Ni_{0.46}Co_{0.23}Mn_{0.31}]O_2$] and another M-type compound also as described by Y-K Sun in ElectrochimicaActa, Vol. 55, Issue 28, p. 8621-8627, all of which can preferably be blended with compounds as described above.

The compounds A-M blended as two or more compounds into high voltage cathodes can preferably be coated with a surface modifier. When a surface modifier is used, it is preferred, although not necessary, that each compound be coated with the same surface modifier. The surface modifier helps increase first cycle efficiency of the cathode mixture and rate capability. Also, useful life is improved with applying the surface modifying material. Examples of surface modifiers are $Al_2O_3$, $Nb_2O_5$, $ZrO_2$, ZnO, MgO, $TiO_2$, metal flourides such as $AlF_3$, metal phosphates $AlPO_4$ and $CoPO_4$. Such surface modifying compounds have been described in the literature earlier [J. Liu et al, J. of Materials Chemistry 20 (2010) 3961-3967; ST Myung et al, Chemistry of Materials 17 (2005) 3695-3704; S. T. Myung et al J. of Physical Chemistry C 111 (2007) 4061-4067; ST Myung et al J. of Physical Chemistry C 1154 (2010) 4710-4718; BC Park et al, J. of Power Sources 178 (2008) 826-831; J. Cho et al, J of Electrochemical Society 151 (2004) A1707-A1711], but never reported in conjunction with blended cathodes at voltages above 4.2V. In particular it is beneficial to blend surface modified compounds B, C, D, E, F, G, L, and M for operation above 4.2V.

The cathode material is mixed with a binder and carbon black, such as ketjen black, or other conductive additives. N-Methylpyrrolidone (NMP) is typically used to dissolve the binder and Polyvinylidene fluoride (PVDF) is a preferred binder for Li-ion, while Li polymer type can have other binders. The cathode slurry is mixed to stable viscosity and is well known in the art. Compounds A-M and their blends described above are herein sometimes referred collectively as "cathode active materials". Similarly anode compounds are referred to as anode active materials.

A cathode electrode can be fabricated by mixing for instance a cathode compound, such as the blends or individual compounds of Compound A-M above, at about 94% cathode active materials and about 2% carbon black and 3% PVDF binder. Carbon black can be Ketjen black, Super P, acetylene black, and other conductive additives available from multiple suppliers including AkzoNobel, Timcal, and Cabot. A slurry is created by mixing these components with NMP solvent and the slurry is then coated onto both sides of an Aluminum foil of about 20 micrometer thickness and dried at about 100-130° C. at desired thickness and area weight. This electrode is then calendared, by rolls, to desired thickness and density.

The anode is prepared similarly, but about 94-96% anode active material, in case of graphite, is typically used, while PVDF binder is at 4%. Sometimes styrene-butadiene rubber (SBR) binder is used for cathode mixed with CMC and for that type of binder higher relative amounts of anode active materials at about 98% can typically be used. For anode, carbon black can sometimes be used to increase rate capability. Anode may be coated on copper foil of about 10 micrometer.

Those skilled in the art would easily be able to mix compositions as described above for functional electrodes.

To limit electrode expansion during charge and discharge fiber materials of polyethylene (PE), polypropylene (PP), and carbon can optionally be added to the electrode formulation. Other expansion techniques use inert ceramic particulates such as $SiO_2$, $TiO_2$, $ZrO_2$ or $Al_2O_3$ in the electrode formulation. Generally the density of cathodes is between 3 and 4 $g/cm^3$, preferably between 3.6 and 3.8 $g/cm^3$ and graphite anodes between 1.4 and 1.9 $g/cm^3$, preferably 1.6-1.8 $g/cm^3$, which is achieved by the pressing.

Separator

The separator generally takes the form of an electrically insulating film that is inserted between anode and cathode electrodes and should have high permeability for Li ions as well as high strength in tensile and transverse direction and high penetration strength. The pore size is typically between 0.01 and 1 micrometer and thickness is between 5 micrometer and 50 micrometer. Sheets of non-woven polyolefins, such as polyethylene (PE), polypropylene (PP) or PP/PE/PP structures are typically used. A ceramic, typically consisting of $Al_2O_3$, may be applied onto the film to improve shrinking upon heating and improve protection against internal shorts. Also the cathode or the anode can be coated similarly with a ceramic. Separators can be procured from multiple suppliers in the industry including Celgard, SK, Ube, Asahi Kasei, Tonen/Exxon, and WScope.

Electrolyte

The electrolyte is typically found in the industry containing solvents and salts. Solvents are typically selected between DEC (diethyl carbonate), EC (ethylene carbonate), EMC (ethyl methyl carbonate), PC (propylene carbonate), DMC (dimethyl carbonate), 1,3dioxolane, EA (ethyl acetate), tetrahydrofuran (THF). Salts are selected between $LiPF_6$, $LiClO_4$, $LiAsF_6$, $LiBF_4$, sulfur or imide containing compounds used in electrolyte includes $LiCFSO_3$, $LiN(CF_3SO_2)_2$, $LiN(CF_3CF_2SO_2)_2$, or a plain sulfonation by bubbling $SO_2$ through a premixed electrolyte such as EC/EMC/DMC (1:1:1 ratio) and 1M $LiPF_6$. Other salts are LiBOB (Lithium Bis-oxalateborate), TEATFB (tetraethylammoniumtetrafluoroborate), TEMABF4 (triethylmethylammoniumtetrafluoroborate). Additive for effective SEI formation, gas generation, flame retardant properties, or redox shuttling capability can also be used, including BP (biphenyl), FEC, pyridine, triethylphosphite, triethanolamine, ethylenediamine, hexaphosphorictriamide, sulfur, PS (propylenesulfite), ES (ethylenesulfite), TPP (triphenylphosphate), ammonium salts, halogen containing solvents, such as carbon tetrachloride or ethylene trifluoride and additionally $Co_2$ gas to improve high temperature storage characteristics. For solid/gel or polymer electrolytes PVDF, PVDF-HFP, EMITFSI, LiTFSI, PEO, PAN, PMMA, PVC, any blends of these polymers, can be used along with other electrolyte components to provide a gel electrolyte. Electrolyte suppliers include Cheil, Ube, Mitsubishi Chemical, BASF, Tomiyama, Guotsa-Huasong, and Novolyte. There are electrolytes that work for both supercapacitors (those having electrochemical doublelayers) and standard Li-ion batteries. For those electrolytes one or more supercapacitorcores can be mixed with one or more regular Li-ion core member in an enclosure, so that the supercapacitor component works as a power agent and the Li-ion core member as an energy harvesting agent.

EXAMPLE 1

In this example, a set of 5 jelly roll type core members of cylindrical shape that are connected in parallel to two common bus bars (positive and negative), like the MC battery configuration shown in FIG. 1, but with only half as many core members. The negative connector is connected to the tabs extending from the jelly roll's anode foil (copper), has a coated graphite electrode, and the positive connector to the jelly roll's cathode foil (aluminum) has a blended oxide electrode structure of Compound M and Compound F. The anode tab made out of nickel and the cathode tab made of aluminum is welded to the bus bar using spot welding or laser welding techniques. The enclosure and support member are made of plastic material (polyethylene). For this example, cylindrical cavities with an 18 mm diameter and the jelly roll core members with a slightly smaller diameter (17.9 mm) were used. The enclosure and lid are made of plastic material that is ultrasonically welded together and thereby creating a hermetic seal. Another enclosure and lid example may be made of aluminum, with incorporated vent and terminal feed through structures, connecting the anode and cathode bus bars to a positive and negative terminal on the cell.

One skilled in the art can select and vary the property of the core members, as described above, achieve high energy or high power cores. The table shown below outlines three examples, with varying core compositions of the 5 core member example described above and the different properties of the MC battery that can be achieved. In this example a set of 5 jelly roll type core members of cylindrical shape that are connected in parallel to two common bus bars (positive and negative), like the MC battery configuration shown in FIG. 1, but with only half as many core members. The negative connector is connected to the tabs extending from the jelly roll's anode foil (copper), has a coated graphite electrode, and the positive connector to the jelly roll's cathode foil (aluminum) has a blended oxide electrode structure of Compound M and Compound F. The anode tab made out of nickel and the cathode tab made of aluminum is welded to the bus bar using spot welding or laser welding techniques. The enclosure and support member are made of plastic material (polyethylene). For this example, cylindrical cavities with an 18 mm diameter and the jelly roll core members with a slightly smaller diameter (17.9 mm) were used. The enclosure and lid are made of plastic material that is ultrasonically welded together and thereby creating a hermetic seal.

One skilled in the art can select and vary the property of the core members, as described above, achieve high energy or high power cores. The table shown below (Table 2) outlines three examples, with varying core compositions of the 5 core member example described above and the different properties of the MC battery that can be achieved.

TABLE 2

| CORE | EXAMPLE 1 | EXAMPLE 2 | EXAMPLE 3 |
|---|---|---|---|
| 1 | 3 Ah, energy core M cathode | 1.5 Ah, power core D cathode | 2.5 Ah, power core (0.8 F/0.2 D) cathode mix |
| 2 | 3 Ah, energy core M cathode | 3.0 Ah, energy core D cathode | 3.0 Ah, energy core M cathode |
| 3 | 3 Ah, energy core M cathode | 3.0 Ah, energy core D cathode | 3.0 Ah, energy core M cathode |
| 4 | 3 Ah, energy core M cathode | 3.0 Ah, energy core D cathode | 3/0 Ah, energy Core M cathode |
| 5 | 3 Ah, energy core M cathode | 1.5 Ah, power core D cathode | 3.0 Ah, energy core M cathode |
| SUMMARY | IDENTICAL PROPERTIES ON ALL CORES | MIXED POWER AND ENERGY CORES, MIXED CAPACITY, SAME VOLTAGE | MIXED POWER AND ENERGY CORES, MIXED CAPACITY, MIXED VOLTAGE |

The present disclosure further provides advantageous energy storage device/lithium ion battery implementations that include, inter alia, materials that provide advantageous endothermic functionalities that contribute to the safety and/or stability of the batteries, e.g., by managing heat/temperature conditions and reducing the likelihood and/or magnitude of potential thermal runaway conditions.

For comparison purposes, the performance during thermal runaway of a conventional insulation without an endothermic gas-generating material is significantly worse than that of an insulation with endothermic material(s) of the present disclosure. For lithium ion storage devices, a 200° C.-250° C. temperature range is considered dangerous for the onset of thermal runaway.

In comparative tests of maintenance free battery constructions that include six (6) 5 Ah Li-ion cells housed in respectively:

insulation that includes an endothermic material according to the present disclosure [Reference M1—see also Table 3 below]; and insulation without an endothermic material [Reference M2—a vacuum formed and thermally bonded board];

a single cell was damaged to induce runaway and temperatures measured of that cell and adjacent cells. The results of the following Table 3 were obtained:

TABLE 3

| | Housing material | M1 | M2 | % temperature reduction |
|---|---|---|---|---|
| Maximum temperature reached (° C.) | Incident cell (#3) | 493 | 659 | −25% |
| | Neighboring cell (#2) | 67 | 168 | −60% |
| | Neighboring cell (#4) | 67 | 204 | −67% |

These results demonstrate clearly:

the significant reduction (25%) in maximum temperature of the damaged (incident) cell; and the dramatic reduction (60% or more) in maximum temperature of the neighboring cells; consequent on inclusion of the disclosed endothermic material.

It should be noted that with endothermic material, neighboring cells were maintained well below 200° C., whereas without the endothermic material the temperature of neighboring cells approached or exceeded 200° C.

The insulating material of the present disclosure generally contains a ceramic insulating matrix in combination with an inorganic endothermic material selected to produce off-gassing at temperatures above normal operating temperatures of the energy storage device/lithium ion battery, but lower than a predetermined temperature liable to lead to thermal runaway due to heating.

According to exemplary embodiments of the present disclosure, the amount of endothermic material is above zero and at an amount effective to provide heat-carrying and gas-diluting effects. As low as 1% by weight gas-generating endothermic material may be effective dependent upon device design, but higher quantities will typically be required and/or desired.

Typically the ratio of ceramic matrix to endothermic material may be in the range 1:19 to 9:1 by weight and preferably in the range 1:9 to 6:4 by weight. Alternative relative levels may be implemented without departing from the spirit or scope of the present disclosure, provided desired functionalities are achieved within the energy storage device/lithium ion battery.

The ceramic matrix typically includes inorganic fibers, and binders, and may include particulate materials. The particulate materials may be microporous in nature, and may include fumed ceramics, opacifiers, and mixtures thereof. The binders may include liquid binders, dry binders or both, and may be inorganic, organic, or both. Opacifiers may be present and, dependent on product form, the endothermic material/system may include water or other solvent as a constituent.

A typical but non-limiting formulation is described in the following Table 4:

TABLE 4

| MATERIAL CATEGORY | WT. % |
|---|---|
| Ceramic Oxide Powder | 0-60 wt % |
| Opacifier | 0-30 wt % |
| Endothermic Material | 10-90 wt % |
| Dry Binder | 0-10 wt % |
| Liquid Binder | 0-60 wt % | with the above named components amounting to greater than 60%, greater than 70%, greater than 80%, or greater than 90% of the composition. The proportions of the components may vary according to product form.

Inorganic fibers generally function to provide structural strength, insulating properties and to prevent shrinkage at elevated temperatures. The structural strength the fibers impart allows for the insulation materials to resist flexural stresses that may cause excessive cracking, either during normal operation or during thermal events. Since the fibers are not organic or pure-carbon based, they will not combust and hence will not contribute to exothermic heat generation. During elevated temperature excursions, the fibers will generally serve to hold the matrix together due to their refractory nature, unlike those that combust or melt at temperatures less than the 900° C., i.e., temperatures often achieved during thermal events. Fibers that could be employed according to the present disclosure include ceramic, E-glass, S-Glass, polycrystalline, phosphoric, leached silica, quartz or zirconia fibers. Depending on design criteria, inorganic fibers may be absent, but typically are present in amounts of 3% or more.

Microporous insulating materials typically include inorganic oxides in which the pore size is so small that the material interferes with the mean free path of gas due to convection, while also minimizing conduction through minimizing contact points between the particles. Typical materials utilized for microporous materials are ceramic oxide powders, for example, fumed silica, fumed alumina, fumed zirconia, or mixtures thereof. The amount of microporous material necessary for exemplary implementations of the present disclosure is generally a function of the nature of the energy storage/battery assembly. According to the present disclosure, microporous material may be included in the disclosed endothermic materials/systems at levels ranging from 0% (i.e., non-present) through to embodiments with up to 60% microporous material. The purpose of the microporous component is generally to insulate the affected cell to a level that the heat flux that does flow outward is sufficiently low that it can be conveyed through the whole of the assembly by conduction without raising any point outside the affected cell above the thermal ignition point. For example, if the overall design of the energy storage device/battery includes relatively small cells that are sufficiently insulated and/or the energy storage device/battery is characterized by relatively low energy capacity, then very little if any microporous material would be needed. In such circumstance, the insulating characteristics of the ceramic fiber matrix materials may be enough. If, however, the insulated cell contains a high level of potential thermal energy, then a relatively high amount of microporous material may be necessary and/or desirable to prevent adjacent cells from rising above the ignition temperatures while also providing time for the endothermic materials to react and absorb energy if the temperatures become high enough.

The opacifier is a component that may augment the performance of the insulating material during thermal upset conditions where the temperatures rise into the levels of radiant heat. The need for opacifiers is generally dependent upon the heat release characteristics of the energy storage device/battery analogous to the description above for the microporous component. If the temperatures during a thermal event are sufficiently high to reach radiant heat temperatures, then an opacifier will help to slow transmission of any radiant heat generated. In this application, neither the microporous material, the fiber matrix nor a combination thereof is effective against radiant heat transfers by themselves. Common opacifier materials include $TiO_2$, silicon, alumina, clay (which may function both as opacifier and binder), SiC and heavy metal oxides. These opacifiers do not provide any function according to the present disclosure at normal operating temperatures or even at lower temperatures during a thermal event. The opacifiers tend to be high in cost and very dense and, therefore, add weight to the storage device/battery. Depending upon the design of the energy storage unit/battery and the nature of the heat release during a thermal event, the range for opacifier additions generally ranges from 0 to 30 percent.

The endothermic material constituent offers significant benefits according to exemplary embodiment of the present disclosure. It is known that most energy storage devices/lithium ion batteries function well at 60° C. or below. The disclosed endothermic materials/systems of the present disclosure are generally designed and/or selected to begin their respective endothermic reaction(s) above this temperature, but preferably low enough that the endothermic materials/systems can begin absorbing heat energy generated during a thermal event at the initial moments of such an event to minimize temperature rise in the affected cells and adjacent cells. Upon exceeding a set level above the normal operating temperature, the endothermic material absorbs heat and evolves gas. The evolving gas serves to dilute, neutralize and carry away heat. Also, the sudden generation of heat can be used to signal or cause the vents in energy storage devices to begin venting. The amount of endothermic material needed or desired generally depends upon device configuration, energy density and thermal conductivity of the remainder of the insulating material components. Endothermic materials/systems with 76% or more by weight endothermic gas-generating material are contemplated, although differing ratios and/or ranges may be employed without departing from the spirit or scope of the present disclosure.

The amount of endothermic gas-generating material may also be regulated to achieve a desired volume of gas generation and the selection of type can be used to set the temperature at which the endothermic gas generation should occur. In highly insulating systems, a higher temperature may be desired whereas, in less insulating systems, a lower temperature may be needed to prevent temperatures in neighboring cells reaching critical ignition temperature. Typical inorganic endothermic materials that would meet these requirements include, but are not limited to, the following endothermic materials:

TABLE 5

| Mineral | Chemical Formula | Approximate onset of Decomposition (° C.) |
|---|---|---|
| Nesquehonite | $MgCO_3 \cdot 3H_2O$ | 70-100 |
| Gypsum | $CaSO_4 \cdot 2H_2O$ | 60-130 |

TABLE 5-continued

| Mineral | Chemical Formula | Approximate onset of Decomposition (° C.) |
|---|---|---|
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 |

As noted above, these endothermic materials typically contain hydroxyl or hydrous components, possibly in combination with other carbonates or sulphates. Alternative materials include non-hydrous carbonates, sulphates and phosphates. A common example would be sodium bicarbonate which decomposes above 50° C. to give sodium carbonate, carbon dioxide and water.

In another embodiment of the present disclosure, jelly rolls or enclosed jelly roll units in a multi-core electrochemical assembly can be located in a housing (see, e.g., housing 20 in FIG. 6 of the appended provisional patent application), where individual jelly rolls or enclosed jelly roll units are separated by a house material or a combination of house materials. Examples of commercially available enclosed jelly rolls units are 18650, 183765, 26650 and other types of Li-ion cells, available from companies such as Sanyo, Panasonic, Sony, Samsung, LG, Boston-Power and many others. Each of the jelly rolls or enclosed jelly roll units are surrounded in part or in full by the housing materials. One of the purposes of using a housing is to increase safety through delaying heat propagation between jelly rolls upon thermal abuse. Another purpose of the housing is to mechanically protect the jelly rolls or enclosed jelly roll units by absorbing damage otherwise made by impact energy, external penetration, prevention of vibration damages to the structure, to mention a few mechanical failures. The housing can have different configurations and formats. It can be cylindrical holes in a block where individual jelly rolls can be held in these holes. It can be plates, fabric pads or meshes inserted between jelly rolls or wrapping individual jelly rolls to separate them, hold them in position and provide some mechanical support. The housing material can be metal foams, such as aluminum foams, nickel foams and stainless steel foams. Suppliers for these foams include Cymat and ERG. It can also be solid, porous or microporous ceramics, such as alumina, silicate based ceramics and $ZrO_2$, etc. Suppliers of materials include ERG, CeramaTec, Morgan Advanced Materials, Saint Gobain, Zircar, and Coors. Specific materials include, but are not limited to, the following vendors: material type; CeramTec: porous $Al_2O_3$—$SiO_2$ composite (V 38 Alumina): 96% $Al_2O_3$; ZIRCAR CERAMICS: micro porous $SiO_2$—SiC composite (MICROSIL): $SiO_2$: 85%, SiC: 15%; Morgan Advanced Materials: microporous ceramics (Min-K, BTU-BLOCK and Kaowoo): Kaowoo: $Al_2O_3$—$SiO_2$; Refractory Specialties: microporous ceramics (MicroCell): MicroCell S: $Al_2O_3$—$SiO_2$ 10%-35% others 55%; Induceramic: Porous ceramics (TC1250, TC1600 and TC1750): $Al_2O_3$—$SiO_2$ composites ($Al_2O_3$ in TC1250: 45%, in TC1600: 72% and in TC1750: 96%). Housing materials can further be metals and carbon materials, such as Al, stainless steel, Ni, graphite and carbon composites. Furthermore, it can be polymer materials, such as polyethylene, polypropylene, ethylene and propylene copolymers and Teflon. In one embodiment of the invention, at least one heat absorbing agents is incorporated into the housing materials to form composite housing materials. This heat absorbing agent can be positioned through the material as a composite, in pores of the material, or in pockets inside the materials housing. The heat absorbing agents will absorb the heat from jelly rolls having enhanced temperature at a certain transition temperature, either through chemical reactions or physical transformations. One example of a chemically heat absorbing material is sodium bicarbonate. When temperature is above 50° C., it endothermically decomposes to sodium carbonate, carbon dioxide and water.

In further exemplary embodiments of the present disclosure, a plurality of endothermic materials are incorporated into the same energy storage device/lithium ion battery, wherein the constituent endothermic materials initiate their respective endothermic reactions at different temperatures. For example, sodium bicarbonate may be combined with $Al(OH)_3$ [also known as ATH (aluminum trihydrate)] to provide a dual response endothermic material/system according to the present disclosure. In such exemplary implementation, the sodium bicarbonate can be expected to begin absorbing energy and evolving gas slightly above 50° C., whereas ATH would not begin absorbing energy and evolving gas until the system temperature reached approximately 180-200° C. Thus, it is specifically contemplated according to the present disclosure that the endothermic material may be a single material or mixture of endothermic materials.

It should be noted that some materials have more than one decomposition temperature. For example, hydromagnesite referred to above as having a decomposition temperature starting in the range 220-240° C. decomposes in steps: first by release of water of crystallization at about 220° C.; then at about 330° C. by breakdown of hydroxide ions to release more water; then at about 350° C. to release carbon dioxide. However, these steps in decomposition are fixed and do not permit control of at what temperatures heat is absorbed and at what temperatures gas is generated.

By use of a mixture of two or more endothermic materials having different decomposition temperatures, the cooling effect can be controlled over a wider temperature range than with one material alone. The two or more endothermic materials may comprise one or more non-gas generating endothermic materials in combination with one or more gas-generating materials.

By use of a mixture of two or more endothermic materials evolving gas at different decomposition temperatures, the production of gas can be controlled over a wider temperature range than with one material alone. The number and nature of endothermic materials used can hence be tailored to give tailored heat absorption and gas evolution profiles. Such tailoring of heat absorption and gas evolution profiles by mixing different endothermic materials allows the control of the evolution of temperature and pressure to meet design requirements of the apparatus in which the material is used.

The binder phase of the insulation can be inorganic or organic in nature, but is preferably inorganic. The intent of the binder phase is to provide adequate structural integrity to assemble the device, hold the cells in place during normal operation and, optionally, to provide mechanical stability during a thermal event. The type and amount of binder can be varied to allow for the desired rigidity necessary for assembly and in-service mechanical performance. An example of a binder that would allow a highly flexible insulation material is a natural and/or synthetic latex material. One or more starches could be used to produce more rigid formations. Thermosetting binders may also be utilized, especially when high levels of microporosity are utilized. For those applications where organic binders are not desirable, then inorganic binders are advantageously employed, such as, but not limited to sodium silicate, potassium silicate, colloidal silica and colloidal alumina. Refractory clay(s), such as kaolin, may also be used as binder(s). These clays also contain water, which at highly elevated temperatures volatizes off in an endothermic manner, providing further benefit in the disclosed systems. All of the inorganic binders can be added to the insulating material either in solution/suspension or in a dry form depending upon the forming process employed.

It is noted that not all constituent materials disclosed with respect to the endothermic materials/systems of the present disclosure are compatible with the commonly applied manufacturing routes. For this reason, the design requirements of a particular energy storage device/battery may dictate the necessary and/or desired manufacturing route. In selecting manufacturing method(s) for a particular application, it is noted that:

a. A brittle material is not as good as a material that can be deformed without cracks during mechanical abuse. Accordingly, manufacturing methods and formulations that minimize the brittleness, and increase the deformability, of the disclosed endothermic materials/systems are generally preferable.

b. A material that is soft is generally preferable as compared to a hard material from a point of not being able to penetrate the jelly rolls and cause internal shorts. On the other hand, a hard material can increase the strength so that crash can be mitigated and protect the jelly roll. Accordingly, manufacturing methods and formulations that optimize the noted balance of soft/hard attributes in fabricating the disclosed endothermic materials/systems are generally preferable.

c. Once the cell or module is deformed, it is desirable that the endothermal protection is as homogenous as possible even after the crash, so that thermal protection is intact. Accordingly, manufacturing methods and formulations that deliver homogeneity are generally preferable.

d. If the endothermic material/system contains water and is to be used with an energy storage device sensitive to water, the vapor pressure of water associated with the endothermic material/system in normal operating temperatures of the associated electrical storage device is desirably low.

e. Differing regions of a device that includes a plurality of electrical storage devices may require different levels of endothermic materials and so a material having different concentrations of endothermic material through its extent may be applied. For example the material may include:

a surface region having a higher concentration of endothermic material than a region within the body of the material; and/or a surface region having a higher concentration of endothermic material than a different surface region of the material By way of example, four exemplary manufacturing methodologies/formulation combinations are described below. However, the present disclosure is not limited by or to these exemplary modalities.

Dry Pressing

One exemplary method of manufacture of the disclosed endothermic materials/systems according to the present disclosure is to first dry blend the constituents together and then press them into a desired initial shape under high pressures until a microporous structure is formed. If high green strengths are desired, then a dry thermosetting binder can be added in the blending step, in which case the shape is held at temperatures below that at which gas would evolve from the endothermic material, but high enough to set the thermosetting binder. This can be done either during the pressing step or afterward. Once completed, the resulting shape can be machined to the specified design. A typical formulation for this manufacturing route is given below.

TABLE 6

Typical dry pressed shape formulation

| MATERIAL CATEGORY | WT. % |
| --- | --- |
| Ceramic Powder | 0-60 wt % |
| Opacifier | 0-30 wt % |
| Endothermic Material | 10-60 wt % |
| Dry Binder | 0-10 wt % |
| Fiber | 3-15 wt % |

Infiltration of a Preform

In an alternative exemplary method of manufacture of the disclosed endothermic materials/systems according to the present disclosure, the product is formed in a process in which a fiber component is first preformed into a shape (preform), and then subsequently infiltrated with a suspension containing the remaining constituents.

The preform may be created using commonly applied vacuum forming techniques employed by other industries, such as pulp molding, paper and ceramic fiber shapes. In these processes, a dilute suspension of the fiber component in a liquid (a slurry) is exposed to a mesh screen upon which the slurry constituents build up as the liquid (typically water) is drawn through. The concentration of the slurry varies to match the process being used and fiber properties. An organic or inorganic binder may also be incorporated into this step. Once the shape (or flat material) builds to a desired thickness, it is removed from the suspension and dried until sufficient handling strength and open porosity is achieved to allow for infiltration.

Infiltration may be accomplished by submerging the preform (or flat material) into a suspension of the remaining non-fiber constituents of the present disclosure. Capillary action draws the suspension into the porosity, displacing air in the process. Infiltration can be assisted through the application of either vacuum or pressure, if needed. The infiltrated part is then dried to remove water. Once water is removed, the binder (if present) will harden. The resultant material can then be further machined and/or processed, if required, or used as is, if appropriate.

This manufacturing route lends itself to producing formulations with high endothermic material loading, readily achieving an 80% loading and extendable to higher loadings still. Table 7 shows the dry ingredients of a typical fiber preform (where there is reference to liquid binder, this means the set residue of a liquid binder).

TABLE 7

Typical fiber preform formulation (dry)

| MATERIAL CATEGORY | WT. % |
|---|---|
| Ceramic Oxide Powder | — |
| Opacifier | — |
| Endothermic Material | — |
| Dry Binder | 0-10 wt % |
| Liquid Binder | 10-40 wt % |
| Fiber | 50-90% |

The following Table 8 shows a typical infiltration suspension (where there is reference to liquid binder, this means the liquid binder before setting).

TABLE 8

Typical infiltration suspension

| MATERIAL CATEGORY | WT. % |
|---|---|
| Ceramic Oxide Powder | — |
| Opacifier | 0-20 wt % |
| Endothermic Material | 4-85 wt % |
| Dry Binder | 0-5 wt % |
| Liquid Binder | 0-40 wt % |
| Fiber | — |
| Water | 15-45 wt % |

A typical composition for the resulting final shape of the present disclosure produced by this manufacturing route is given below (where there is reference to liquid binder, this means the set residue of a liquid binder).

TABLE 9

Typical final formulations for infiltrated part

| MATERIAL CATEGORY | WT. % |
|---|---|
| Ceramic Oxide Powder | — |
| Opacifier | 0-16 wt % |
| Endothermic Material | 32-80 wt % |
| Dry Binder | 0-5 wt % |
| Liquid Binder | 2-40 wt % |
| Fiber | 10-18 wt % |

Vacuum Forming

One characteristic of the infiltration technique is the presence of a concentration gradient of the non-fiber constituents. The concentration is greatest on the outer surfaces and decreases towards the center. This is caused by the insulating matrix acting as a filter and restricting infiltrate as it travels further the surface. One-method for reducing non-uniform distribution is to form the disclosed endothermic material/system with all the constituents in one step. In this exemplary vacuum forming manufacturing method, all of the constituent materials are introduced into the initial dilute slurry suspension. The suspension is then formed into the desired shape (or flat material) via standard vacuum forming techniques commonly applied in pulp molding, paper and ceramic fiber industries. The resulting part or paper is then dried and can be used as made, or further machined.

This technique has the advantage of producing a more homogenous shape, but is not well suited for producing formulations with very high loadings of non-fiber constituents. This is due to blinding of the forming screens that interferes with the ability of the suspension to be pulled through. This technique is, therefore, more applicable to thin products, such as papers, or near net shapes where the cross sections are less than 10 mm in thickness. The use of a water suspension generally precludes the use of fumed oxides because these materials cannot create microporous structures once exposed to water.

The following Table 10 shows typical vacuum formed shape chemistry excluding process water and in which, where there is reference to liquid binder, this means the unset liquid binder.

TABLE 10

Typical vacuum formed shape chemistry

| MATERIAL CATEGORY | WT. % |
|---|---|
| Ceramic Oxide Powder | — |
| Opacifier | 0-30 wt % |
| Endothermic Material | 10-85 wt % |
| Dry Binder | 0-10 wt % |
| Liquid Binder | 3-15 wt % |
| Fiber | 3-60 wt % |

Moldable Products

The endothermic materials/systems according to the present disclosure can also be made as a moldable material for use in forming the assembly of the energy storage device/battery instead of in the form of an article. The manufacturing of the moldable version typically starts with wet mixing constituents in a mixer until well mixed (e.g., for approximately 10 minutes). A biocide may be added at this point to prevent mold growth during storage. pH modifiers may be included, if required. Once mixing is complete, the moldable products can then be packaged into caulking tubes or drums for storage and distribution prior to assembly. During assembly, the moldable material may be injected, pressed, or otherwise placed into the areas to be insulated and the resultant assembly dried to remove water. Typically, if an inorganic binder is used, then the dried part will adhere very tightly to the non-insulation components, adding to the structural integrity of the device. Such a moldable material requires little or no additional machining after drying.

A typical formulation for the moldable production method in given below in Table 11. Due to the nature of fumed ceramic oxides, they generally cannot be wet processed with water, so this manufacturing method normally precludes their incorporation into implementations of the present disclosure.

TABLE 11

Typical mouldable formulation

| INGREDIENTS | WT. % |
|---|---|
| Ceramic Oxide Powder | — |
| Opacifier | 0-15 wt % |
| Endothermic Material | 10-60 wt % |
| Clay Binder | 0-10 wt % |
| Liquid Binder | 5-60 wt % |
| Fiber | 0-10 wt % |
| Added Liquid (e.g., Water) | 0-70 wt % |

It should be noted that the liquid present may include the liquid binder and/or also include added liquid. Setting agents for the liquid binder may be included in the added liquid.

Other Forms

The materials may be in the form of a foam that is chemically and/or mechanically foamed. Foamed ceramics are known for insulation purposes [e.g. U.S. Pat. No. 4,596, 834] and the endothermic material may include part of the constituents of the foam and/or be subsequently impregnated into the foam. Compositions similar to the moldable composition may be foamed.

Typical Compositions

Below are given exemplary compositions that have been demonstrated to provide effective endothermic properties/functionalities according to the present disclosure.

TABLE 12

| Material Category | Description | Pressed Shape | Injectable Paste | Infiltrated Board | Vacuum Shape or Paper |
|---|---|---|---|---|---|
| Ceramic Oxide Powder | Fumed silica type P | 36.50 | 0.00 | 0.00 | 0.00 |
| Ceramic Oxide Powder | Micronized silica | 7.50 | 0.00 | 0.00 | 0.00 |
| Endothermic Material | Alumina Trihydrate | 49.00 | 47.00 | 80.00 | 72.40 |
| Binder | Heat Set Resin binder | 2.00 | 0.00 | 0.00 | 0.00 |
| Binder | Latex Binder | 0.00 | 0.00 | 0.00 | 6.11 |
| Binder | Potassium Silicate (48% solids content) | 0.00 | 10.00 | 0.00 | 0.00 |
| Binder | Colloidal Silica | 0.00 | 0.00 | 4.72 | 1.36 |
| (Stabilizer for Binder) | HCl (20% Solution) | 0.00 | 40.00 | 0.00 | 0.00 |
| Binder | Starch | 0.00 | 0.00 | 1.57 | 0.00 |
| Fiber | SUPERWOOL ® plus bulk fiber (alkaline earth silicate fiber) | 0.00 | 3.00 | 10.24 | 20.14 |
| Fiber | ½" E-glass | 1.00 | 0.00 | 0.00 | 0.00 |
| Fiber | Denka B97T4 Alumina Fiber | 4.00 | 0.00 | 3.46 | 0.00 |
| | | 100.00 | 100.00 | 100.00 | 100.00 |

Nature of Shaped Material

The above description refers to forming shapes, including flat shapes such as boards and papers. These shapes for the present application may have particular forms. For example, the shapes may include:
- a body of material having a recess shaped to receive an energy storage device/battery or cell thereof;
- a body of material having a plurality of recesses, each shaped to receive an energy storage device/battery or cell thereof;
- a material having two or more regions having different concentrations of endothermic material;
- a material having a gradient of endothermic gas-generating material;
- a material that includes a surface region of the material having a higher concentration of endothermic material than a region within the body of the material;
- a material that includes a surface region of the material having a higher concentration of endothermic material than a different surface region of the material.

With reference to the exemplary implementations of the disclosed endothermic materials/systems, it is noted that the positioning/location of thereof within an energy storage device/lithium ion battery is generally selected so as to facilitate the desired energy absorption/transfer functionalities described herein without interfering with the underlying energy generation and storage associated with such energy storage device/lithium ion battery. Moreover, it is generally desirable that the disclosed endothermic materials/systems be positioned/located so as to permit effective gas communication with associated venting functionality, thereby permitting prompt and effective degassing of gaseous by-products generated by the endothermic reaction(s) of the present disclosure.

For example, with reference to FIGS. 1A, 1B and 1D, it is contemplated that the disclosed endothermic materials/systems may be positioned/located, in whole or in part, along the walls separating adjacent cells and/or along the top and/or bottom faces of individual cells. Similarly, with reference to FIG. 2, the disclosed endothermic materials/systems may be positioned/located, in whole or in part, along the walls separating adjacent cells and/or along the top and/or bottom faces of individual cells. With reference to FIGS. 3 and 5, the disclosed endothermic materials/systems may be positioned/located, in whole or in part, within the disclosed jelly rolls and/or along the walls separating adjacent cells and/or along the top and/or bottom faces of individual cells. With reference to FIG. 6A, the disclosed endothermic materials/systems may be positioned/located, in whole or in part, along the walls separating adjacent cells and/or along the top and/or bottom faces of individual cells.

Thus, the disclosed endothermic materials/systems may be employed such that they surround one or more individual sealed cells, in whole or in part, and particularly one or more sealed cells that include single jelly rolls, such as 18650 cells, 183765 cells, and the like. The cells can be serially connected, parallel connected or a combination thereof. In addition, the disclosed endothermic materials/systems may be employed in energy storage devices/lithium ion batteries that include multiple jelly rolls in an open container with a common atmosphere.

It is noted that the venting functionalities associated with the disclosed energy storage devices/lithium ion batteries may take the form of a single vent element that is pressure and/or temperature sensitive, or multiple vent elements that are pressure and/or temperature sensitive. Vent elements may operate to initiate venting at pressures above 3 bars and, in exemplary implementations, at pressures in the range of 5-15 bars, although the selection of operative pressure-release parameters may be influenced by the design and operation of the specific energy storage device/lithium battery. More particularly, the disclosed vent may operate to initiate venting at a predetermined threshold pressure level that falls between about 15 psi and 200 psi, preferably between about 30 psi and 170 psi, and more preferably between about 60 psi and 140 psi.

In further exemplary embodiments of the present disclosure, the venting element(s) may include a flame arrestor that is designed, in whole or in part, to prevent flash back into the cell. For example, a flame arrestor in the shape of a wire mesh may be employed, although alternative designs and/or geometries may be employed, as will be readily apparent to persons skilled in the art.

It is further contemplated that in the case of implementations that include multiple vent elements, the operations of the vent elements may be triggered, in whole or in part, by responsive actions of other vent elements within the overall device/battery. For example, actuation of venting functionality of a first vent element may automatically trigger venting functionality of one or more of the other vent elements associated with the device/battery. Still further, multiple vent elements may be provided that are characterized by different venting thresholds, such that a first vent element may be actuated at a first temperature and/or pressure, whereas a second vent element may be actuated at a second temperature and/or pressure that is higher than the first temperature/pressure.

It is further noted that the vent gases associated with the endothermic reaction(s) dilute the electrolyte gases to provide an opportunity to postpone or eliminate the ignition point and/or flammability associated with the electrolyte gases. Dilution of the electrolyte gases is highly advantageous and represents a further advantage associated with the systems and methods of the present disclosure. [Cf. E. P. Roth and C. J. Orendorff, "How Electrolytes Influence Battery Safety," The Electrochemical Society Interface, Summer 2012, pgs. 45-49.]

In implementing the disclosed endothermic materials/systems, it is contemplated that different formulations and/or quantities may be associated with different cells in a multi-core cell structure. For example, centrally located cells may be clustered and provided with endothermic materials/systems that initiate endothermic reaction(s) at lower temperatures as compared to outer cells based on the likelihood that inner cells may experience earlier abuse temperatures compared to outer cells.

It is noted that when the disclosed endothermic materials/systems are included inside a cell with exposure to electrolyte, e.g., through partial vapor pressure, the transfer of water to the jelly rolls from the endothermic materials/systems is limited and/or non-existent because the water associated with the endothermic material/system is chemically bound. In implementations where the endothermic material/system is positioned/located, in whole or in part, inside these cells, it is important to limit the exposure of water to electrolyte. If the endothermic material/system contains water, the vapor pressure of water associated with the endothermic material/system should be low to limit the potential interference with electrolyte functionality. Indeed, the non-transfer of water to the electrolyte is important in ensuring that the functionality of the underlying cell is not compromised by the presence of the disclosed endothermic materials/systems. This feature is especially important for those configurations where the core is open to the general atmosphere inside an otherwise hermetically sealed cell.

Of note, even after the endothermic material associated with the disclosed endothermic materials/systems has been consumed, i.e., the endothermic reaction(s) associated with such endothermic material have consumed all available endothermic material, the disclosed endothermic materials/systems continue to provide advantageous insulating functionality to the energy storage device/lithium ion battery by reason of the other insulative constituents associated with the endothermic materials/systems.

Figures 8, 9:
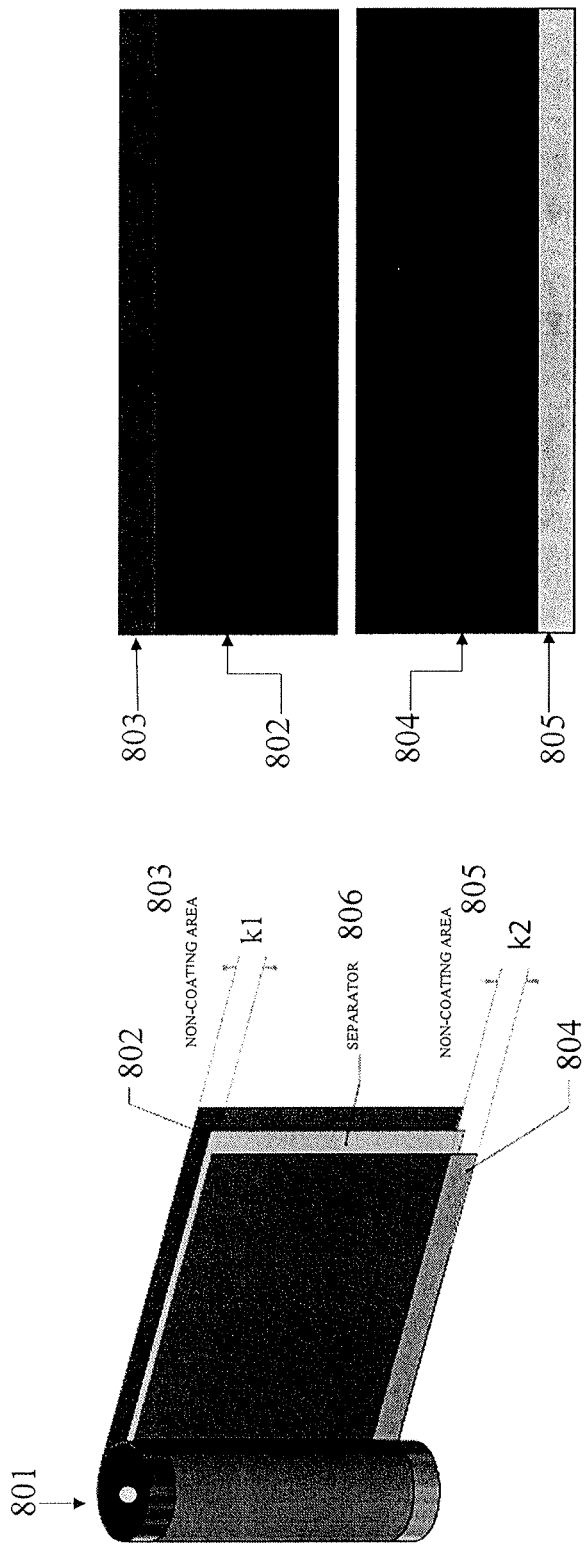
FIG. 8 is an unfolded view of a jelly roll according to the present disclosure.
FIG. 9 is an unfolded view of an anode and cathode with non-coated areas according to the present disclosure.

Turning to other advantageous aspects of the present disclosure, a rechargeable electrochemical energy storage unit may be provided that uses a multi-core electrochemical assembly having at least one jelly roll, one negative bus bas, one positive bar and a case. A jelly roll as used herein is meant the smallest, independent electrochemical energy storage unit in a battery, including a cathode, an anode, and a separator. The jelly roll 801 (FIG. 8) includes cathode 804, anode 802 and separator 806. In a Li-ion battery, the cathode and anode active materials are generally coated on both sides of aluminum foil current collector and copper foil current collector, respectively, with non-coated areas 803 and 805 at one edge of both current foils (FIG. 9). The non-coated Al foil area in the cathode and the non-coated Cu foil area in the anode are located in both ends of jelly roll, respectively. The separator covers the electrode coated areas and extends to cover the part of both non-coated areas to prevent shorting between the cathode and anode. To maximize gravimetric and volumetric energy densities of a jelly roll, it is better to keep minimum width of the non-coated area, k1 and k2. However, when k1 and k2 are too small, it will be a challenge to keep good electrode alignment and good welding. It is appropriate to keep k1 and k2 larger than 0.1 mm and less than 50% of the full width of the corresponding anode or cathode current collector. A typical preferred range is 1-4 mm.

In one embodiment of the present disclosure, only the cathode is fabricated as a non-coated area (k2) and the anode is using at least one tab to connect to the NBB. For this case, the anode electrode coating layer extends throughout the full width of the current collector foil. The width of the separator covers all anode but not all of the cathode non-coated area. This jelly roll with only non-coated area in the cathode edge and tab(s) on the anode is referenced herein as "Jelly Roll A".

Although Cu and Al foils are most commonly used current collectors for Li-ion battery, other types of collectors have also been reported in literatures and may be used. For example, nickel foil was used as anode collector (Y. Yun et al, Electrochimica Acta, Vol 54, 7227 (2009)). In the present disclosure, the current collectors include all types of current collector materials and formats used in Li-ion battery, not limited to Al and Cu foils. In addition to foils, they can take formats in meshes, clothes, etc.

Figure 10A:
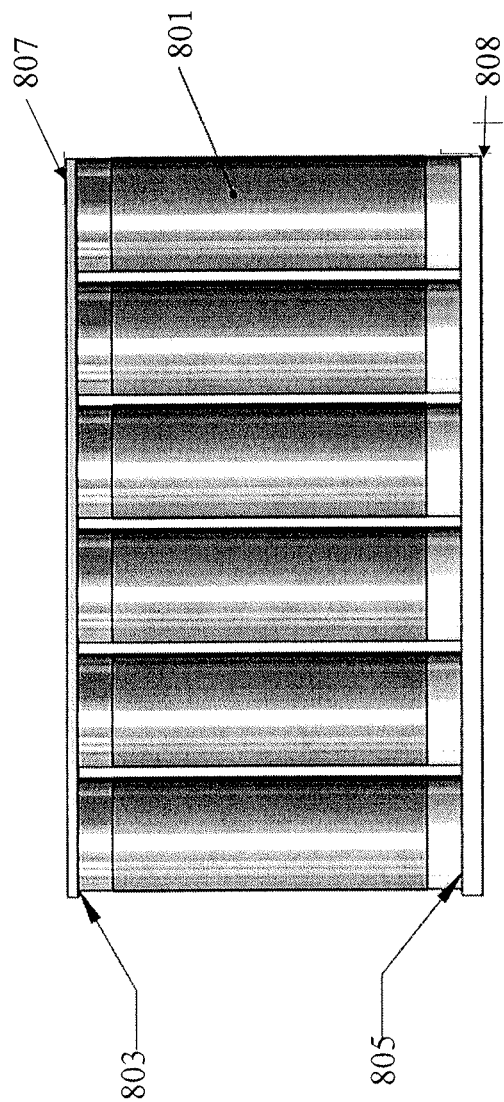
FIG. 10A is a direct view of a multi-core assembly with Cu NBB and Al PBB according to the present disclosure.
Figure 10B:
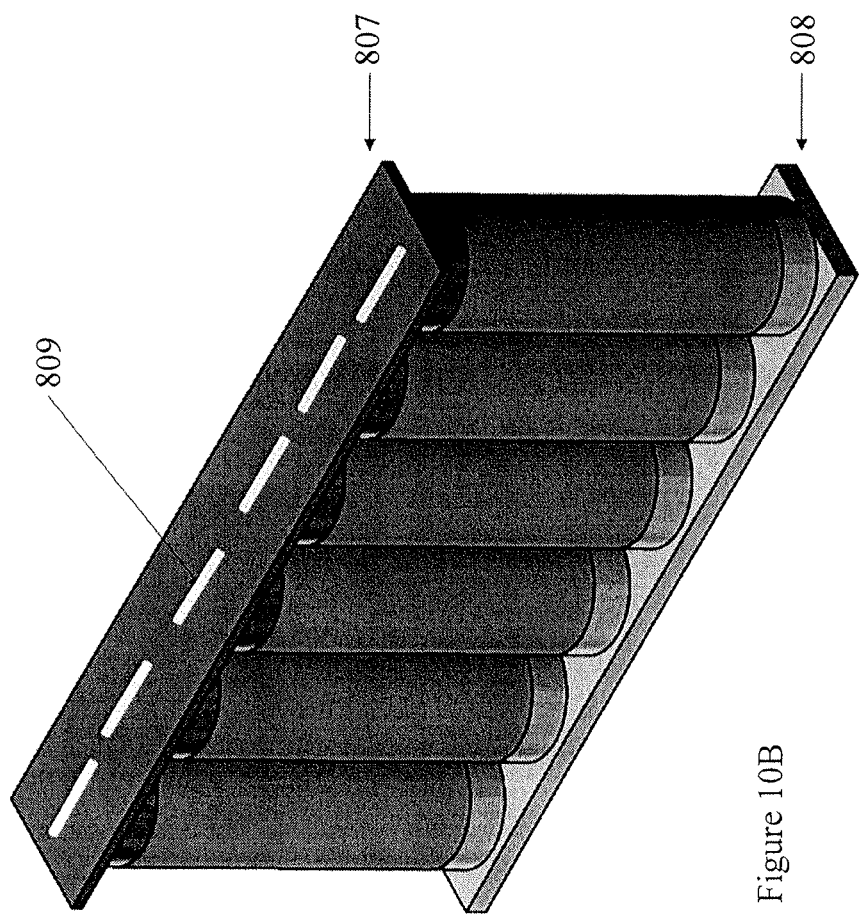
FIG. 10B is a top side view of a multi-core assembly with Cu NBB and Al PBB according to the present disclosure.

An exemplary multi-core electrochemical assembly that includes a plurality of jelly rolls that are connected in parallel is shown in FIG. 10A. The ends of non-coated copper foil 803 of jelly rolls are welded on a copper plate 807 (NBB) that functions both as current collectors for individual jelly rolls and a joining busbar for all jelly rolls. Similarly, the ends of non-coated aluminum foil 805 of jelly rolls are welded on an aluminum plate 808 (PBB). The NBB and PBB allow high current drain for the jelly roll with reduced heat generation, in part acting as a heat sink. Furthermore, since no additional busbars are needed, the design reduces weight, void space and cost of the multi-core electrochemical assembly.

For a multi-core electrochemical assembly consisting of a plurality of Jelly Roll A, only the cathode non-coated ends are welded on PBB. The anode tabs are welded on a negative busbar. This type multi-core assembly is inferior to the assembly with NBB and PBB in terms of energy density, but can be used in special cases where the layout structure calls for tabs.

In the NBB, there are plurality of slit openings 809 corresponding to individual jelly rolls to allow electrolyte filling. In order to allow effective electrolyte filling, the length of the slit opening is better to be close to the diameter of jelly roll. Since one end of jelly roll is welded on PBB and the jelly roll is wrapped by an insulating tape which contains the electrolyte, the electrolyte filled through slit opening can be made entirely self-contained in the jelly roll. Such an arrangement may allow the elimination of any electrolyte constraining components, such as metal shells, such as cans, or plastic liners for each individual jelly rolls, which are optional according to embodiments disclosed herein. In certain cases, such electrolyte constraining liners or cans are necessary. In one embodiment, the electrolyte is contained in individually enclosed jelly roll units. An enclosed jelly roll unit includes a jelly roll and electrolyte that are hermetically sealed in a metallic, plastic or ceramic container to prevent electrolyte leaking to the assembly. For some jelly roll technologies having solid polymer electrolytes, gel polymer electrolytes or thin film solid ionic electrolytes, electrolyte filling process in the assembly is not required. Thus, the electrolyte filling opening in NBB is not needed.

The size of NBB and PBB needs to be able to cover all ends of jelly rolls. Thus, the shapes of NBB and PBB generally depend on the footprint of jelly roll, and are not limited to being rectangular. The thickness of NBB and PBB is generally determined by following equation 1 (ref: http://www.copperinfo.co.uk/busbars/pub22-copper-for-busbars/sec3.htm):

$$I = 1.02 \frac{A^{0.5} p^{0.39} \theta^{0.61}}{[(1+\alpha\theta)\rho]^{0.5}}$$

where I=current, amperes; A=cross-sectional area, $mm^2$; p=perimeter of conductor, mm; θ=temperature difference between conductor and the ambient air, ° C.; α=resistance temperature coefficient of conductor at the ambient temperature, per ° C.; ρ=resistivity of conductor at the ambient temperature, μΩ cm.

A suitable NBB or PBB material for the embodiments under discussion needs to be (i) a good electric conductor; (2) electrochemically stable; (3) chemically inert to electrolyte, and (4) can be easily and firmly attached or mounted on the non-coated ends in the jelly roll. For example, nickel plate is suitable to be NBB. The preferred materials are Cu and Al as NBB and PBB, respectively.

The NBB and PBB are attached to the non-coated ends of jelly roll by welding or conductive adhesives. The conductive adhesives must be stable electrochemically and chemically during storage and operation. The welding methods are preferred due to less likely unstable during storage and operation. Various welding techniques can be used to weld NBB and PBB on the ends of jelly roll, including, but not limited to, laser welding, ultrasonic welding and resistance welding (spot welding) techniques. A preferred technique is laser welding.

Figure 11:
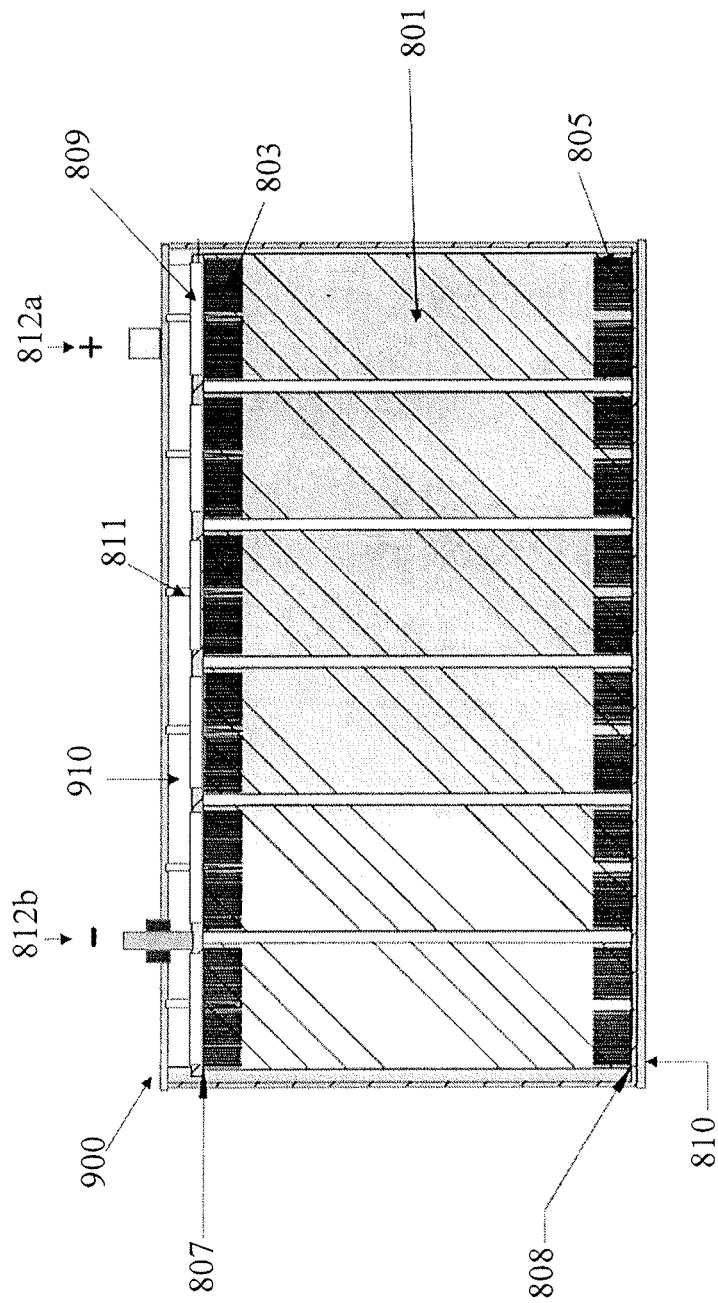
FIG. 11 is a cross-sectional view of a multi-core Li-ion assembly in an exemplary embodiment with an Al PBB welded on the bottom wall of an Al case.

In one embodiment, the multi-core assembly is placed in a metal case 810 (FIG. 11). The metal case can be Al, steel, stainless steel or others commonly used in batteries. The PBB 808 is welded on the bottom of the metal case as positive terminal 812a. A metal connector, such as copper rod, is connected to NBB as negative terminal 812b. An insulation layer 910 is placed between the case cover 900 and NBB. There are openings 811 in the insulation layer 910 corresponding to the slit openings 809 in NBB to allow electrolyte filling. The unit is finally hermetically sealed. Since PBB is welded in bottom of the metal case, the contact area between the PBB and the metal case is same as the PBB. Thus, PBB and the metal case actually act as a heat sink to enable a quick depletion of heat generated in the multi-core assembly, improving the assembly safety.

Figure 12:
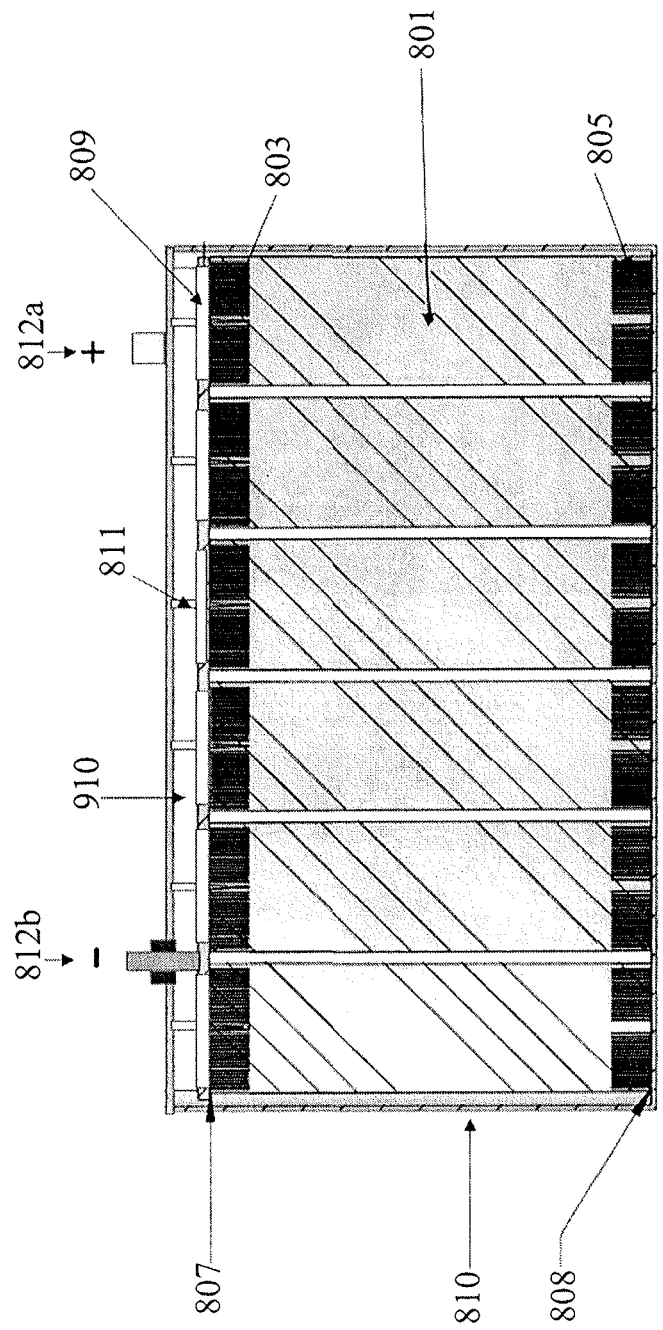
FIG. 12 is a cross-sectional view of a multi-core Li-ion assembly in another exemplary embodiment with an Al PBB welded on the wall of an Al sleeve.

In another embodiment, the jelly roll assembly can also be placed in a metal sleeve 810. PBB is hermetically welded on wall of one of the open ends in the metal sleeve acting as the case bottom (FIG. 12). Although the metals for sleeve have multiple choices, Al is better to ensure good welding. The size of PBB needs to fit the sleeve bottom precisely to ensure a good hermitical seal. If the calculated thickness of PBB is much less than the wall thickness of metal sleeve, the preferred thickness is the sleeve wall thickness to ensure good mechanical performance. PBB as part of metal case of the unit further reduces weight and void space. Furthermore, since PBB is welded in the metal sleeve, the case can act as a heat sink to enable a quick depletion of heat generated in the multi-core assembly, improving the assembly safety.

Figures 13A, 13B:
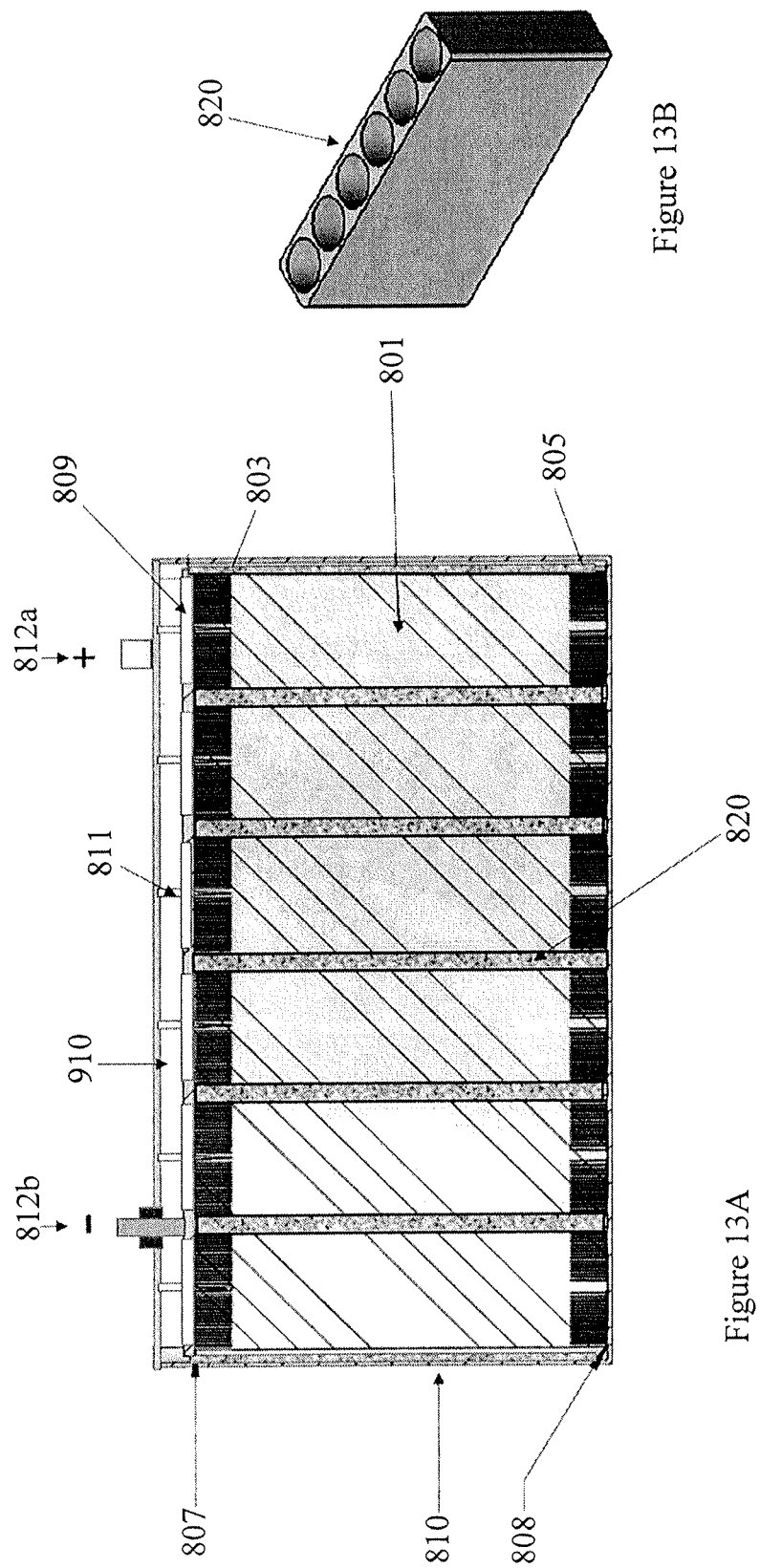
FIG. 13A is a cross-sectional view of a multi-core Li-ion assembly in another exemplary embodiment with a housing for jelly rolls.
FIG. 13B is a top side view of the exemplary housing of FIG. 13A.

Yet in another embodiment, jelly rolls or enclosed jelly roll units in a multi-core electrochemical assembly can be located in a housing 820 (FIG. 13), where individual jelly rolls or enclosed jelly roll units are separated by a house material or a combination of house materials. Examples of commercially available enclosed jelly rolls units are 18650, 183765, 26650 and other types of Li-lion cells, available from companies such as Sanyo, Panasonic, Sony, Samsung, LG, Boston-Power and many others. Each of the jelly rolls or enclosed jelly roll units are surrounded in part or in full by the housing materials. One of the purposes of using a housing is to increase safety through delaying heat propagation between jelly rolls upon thermal abuse. Another purpose of the housing is to mechanically protect the jelly rolls or enclosed jelly roll units by absorbing damage otherwise made by impact energy, external penetration, prevention of vibration damages to the structure, to mention a few mechanical failures. The housing can have different configurations and formats. It can be cylindrical holes in a block where individual jelly rolls can be held in these holes. It can be plates, fabric pads or meshes inserted between jelly rolls or wrapping individual jelly rolls to separate them, hold them in position and provide some mechanical support. The housing material can be metal foams, such as aluminum foams, nickel foams and stainless steel foams. Suppliers for these foams include Cymat and ERG. It can also be solid, porous or microporous ceramics, such as alumina, silicate based ceramics and $ZrO_2$, etc. Suppliers of materials include ERG, CeramaTec, Morgan Advanced Materials, Saint Gobain, Zircar, and Coors. Specific materials include, but are not limited to, the following vendors: material type; CeramTec: porous $Al_2O_3$—$SiO_2$ composite (V 38 Alumina): 96% $Al_2O_3$; ZIRCAR CERAMICS: micro porous $SiO_2$—SIC composite (MICROSIL): $SiO_2$: 85%, SiC: 15%: Morgan Advanced Materials: microporous ceramics (Min-K, BTU-BLOCK and Kaowoo): Kaowoo: $Al_2O_3SiO_2$; Refractory Specialties: microporous ceramics (MicroCell): MicroCell S: $Al_2O_3$—$SiO_2$ 10%-35% others 55%; Induceramic: Porous ceramics (TC1250, TC1600 and TC1750): $Al_2O_3$—$SiO_2$ composites ($Al_2O_3$ in TC1250: 45%, in TC1600: 72% and in TC1750, 96%). Housing materials can further be metals and carbon materials, such as Al, stainless steel, Ni, graphite and carbon composites. Furthermore, it can be polymer materials, such as polyethylene, polypropylene, ethylene and propylene copolymers and Teflon. In one embodiment of the invention, at least one heat absorbing agents is incorporated into the housing materials to form composite housing materials. This heat absorbing agent can be positioned through the material as a composite, in pores of the material, or in pockets inside the materials housing. The heat absorbing agents will absorb the heat from jelly rolls having enhanced temperature at a certain transition temperature, either through chemical reactions or physical transformations. As noted above, one example of a chemically heat absorbing material is sodium bicarbonate. When temperature is above 100° C., it endothermically decomposes to sodium carbonate, carbon dioxide and water. Other endothermic systems/materials may be advantageously employed according to the present disclosure, as described above.

Figure 14C:
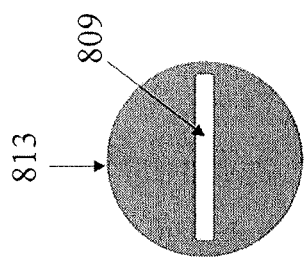
FIG. 14C is a top view of a Cu NBB for a single core Li-ion assembly according to the present disclosure.
Figure 14B:
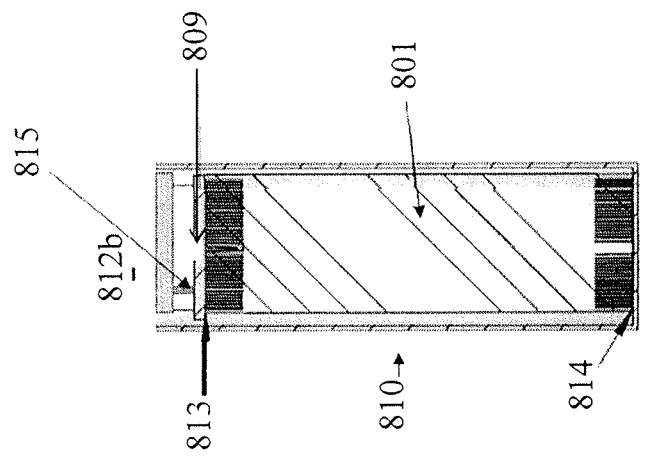
FIG. 14B is a cross-sectional view of another exemplary embodiment of a single core Li-ion assembly according to the present disclosure.
Figure 14A:
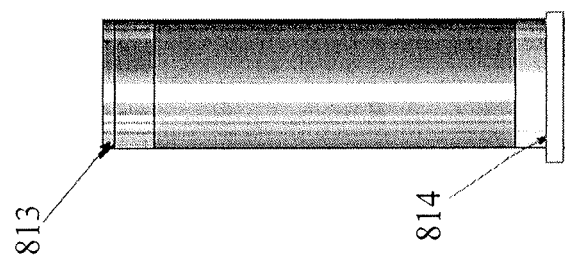
FIG. 14A is a direct view of another exemplary embodiment of a single core assembly with Cu NBB and Al PBB according to the present disclosure.

In another embodiment, a single jelly lithium ion cell is consisting of Cu and Al current collecting discs, 813 & 814. They are welded at Cu non-coated and Al non-coated ends, respectively. This single core assembly is placed in a metal sleeve 810 (FIGS. 14A & 14B). A slit opening 809 is made in the Cu current collecting disc 813 (FIG. 14C). The Al current collecting disc 814 is hermetically welded on the metal sleeve forming a bottom of Al can. This eliminates a metal lead to connect positive current collector and the positive terminal, reducing weight and void space and increasing energy density of the cell. It also enables a quick depletion of heat generated in the cell, improving cell safety. Although the metal for sleeve have multiple choices, Al is better to ensure good welding. The top cover is also hermetically sealed after electrolyte filling.

As noted previously, according to the present disclosure, jelly rolls can take various shapes, such as cylindrical, oval and rectangular, and they are not limited to any particular one. They can be either formed by winding electrodes and separator or formed by stacking electrodes and separator. The size of jelly roll-diameter, thickness and length, depends on the designed capacity of jelly roll. The larger the jelly roll size is, the higher capacity the jelly roll has. In the multi-core assembly, the jelly rolls can have different sizes and shapes as long as both ends of jelly rolls can be welded on NBB and PFF. Furthermore, jelly rolls in a multi-core Li-ion assembly can have different chemistries or have different electrolytes as long as their electrochemical window matches and both ends of jelly rolls can be welded on NBB and PBB.

The anode coating layer in a jelly roll is consisting of anode active material, conductive additives and binder. The conductive additives are one or combination of carbon black, graphite. The binder material is polymer material. The most commonly binder materials are a mixture of SBR and CMC or PVDF. The anode active materials are those commonly found in Li-ion or Li polymer batteries and described in the literature, such as graphite, doped carbon, hard carbon, amorphous carbon, silicon (such as silicon nano particles or Si pillars or dispersed silicon with carbon), tin, tin alloys, $Cu_6Sn_5$, Li, deposited Li onto metal foil substrates, Si with Li, mixed in Li metal powder in graphite, lithium titanate, and any mixtures thereof. The invention is not limited to any particular anode compound.

A typical anode is consisting of graphite, conductive carbon and SBR/CMC binder. A typical composition in an anode is: graphite 80-98% in weight, conductive carbon 0-2% in weight and binder 1-10% in weight. The coating layer thickness depends on designed jelly roll capacity. The thicker the coating layer is, the higher loaded anode capacity in unit area is. In most commercial Li-ion batteries in the market place, the coated anode thickness is 50-200 microns. The most common used current collector is copper foil with a thickness from 8-20 microns.

The cathode coating layer in a jelly roll is consisting of cathode active material, conductive additives and binder. The conductive additives are one or combination of carbon black, graphite. The binder material is polymer material. The most commonly binder material is PVDF. The cathode active materials are those that have ability to absorb and desorb lithium ions during charge and discharge and have relatively higher electrode potential than lithium metal.

Examples of suitable individual cathode materials are $Li_xCoO_2$ (referred to as Compound A), $Li_xM_zCo_wO_2$ (Compound B, where M is selected from Mg, Ti, and Al and partly substituting Co or Li in the crystal lattice and added in the range Z=0-5%, typically W is close to 1, suitable for charge above 4.2V), $Li_xNi_aMn_bCo_cO_2$, in particular the combinations of about a=⅓, b=⅓, c=⅓ (Compound C) and a=0.5, b=0.3, c=0.2 (Compound D), and Mg substituted compounds thereof (both grouped under Compound E). Another example is $Li_xNi_dCo_eAl_fO_2$ (Compound F) and its Mg substituted derivative $Li_xMg_yNi_dCo_eAl_fO_2$ (Compound G), where in a special case d=0.8, e=0.15, f=0.05, but d, e, and f can vary with several percent, y ranges between 0 and 0.05. Yet another example of individual cathode materials are $Li_xFePO_4$ (Compound H), $Li_xCoPO_4$ (Compound I), $Li_xMnPO_4$ (Compound J), and $Li_xMn_2O_4$ (Compound K). In all of these compounds, an excess of lithium is typically found (x>1), but X can vary from about 0.9 to 1.1.

A class of materials that is particularly suited for high voltages, possessing high capacity when charged above 4.2V, are the so-called layered-layered materials described for instance by Thackeray et al. in U.S. Pat. No. 7,358,009 and commercially available from BASF and TODA (Compound L). The compound initially described by Thackeray can be made stable at voltages above 4.2V. Some of these cathodes are stable at high voltages, above 4.2V (the standard highest voltage using graphite as anode) and those materials can be preferably mixed.

Although one of the above materials can be used according to the present disclosure, it is preferred to mix two or more of the materials compounds selected from B, C, D, E, F, G I, J, and L. In particular two or more component mixture of the Compounds B, D, F, G, and L is preferred. For very high energy density configurations a mixture of (B and L) or (B and G) or (G and L) are most beneficial and when these are made as thin electrodes also high power can be achieved. The thin (power) and thick (energy) electrodes can enter into the jelly roll for tailoring of energy to power ratio, while having same suitable voltage range and chemistry. The common thickness of the coating layer is in the range of 60-200 microns. A typical composition of a cathode active material $Li_xNi_aMn_bCo_cO_2$ (Compound C or D) based cathode coating layer has a weight ratio of 70-98% cathode active material, 25-1% conductive carbon and 20-1% PVDF binder.

The separator functions as an electronically insulating film that is inserted between anode and cathode and should have high permeability for Li ions as well as high strength in tensile and transverse direction and high penetration strength. The pore size is typically between 0.01 and 1 micrometer and thickness is between 5 micrometer and 50 micrometer. Sheets of non-woven polyolefins, such as polyethylene (PE), polypropylene (PP) or PP/PE/PP structures are typically used. A ceramic, typically consisting of $Al_2O_3$, may be applied onto the film to improve shrinking upon heating and improve protection against internal shorts. Also the cathode or the anode can be coated similarly with a ceramic. In a polymer Li-ion battery or solid Li-ion battery, however, no separator exists. Instead, a solid polymer electrolyte film, gel polymer electrolyte film or solid ionic thin film is sandwiched between cathode and anode to provide ionic conduction and electronic insulation.

The electrolyte is typically found in the industry containing solvents and salts. Solvents are typically selected between DEC (diethyl carbonate), EC (ethylene carbonate), EMC (ethyl methyl carbonate), PC (propylene carbonate), DMC (dimethyl carbonate), 1,3dioxolane, EA (ethyl acetate), tetrahydrofuran (THF). Salts are selected between $LiPF_6$, $LiClO_4$, $LiAsF_6$, $LiBF_4$, sulfur or imide containing compounds used in electrolyte includes $LiCF_2O_3$, $LiN(CF_3SO_2)_2$, $LiN(CF_3CF_2SO_2)_2$, or a plain sulfonation by bubbling $SO_2$ through a premixed electrolyte such as EC/5 EMC/DMC (1:1:1 ratio) and 1M $LiPF_6$. Other salts are LiBOB (Lithium Bis-oxalateborate), TEATFB (tetraethylammoniumtetrafluoroborate), TEMABF4 (triethylmethylammoniumtetrafluoroborate). Additive for effective SEI formation, gas generation, flame retardant properties, or redox shuttling capability can also be used, including BP (biphenyl), FEC, pyridine, triethylphosphite, triethanolamine, ethylenediamine, hexaphosphorictriamide, sulfur, PS (propylenesulfite), ES (ethylenesulfite), TPP (triphenylphosphate), ammonium salts, halogen containing solvents, such as carbon tetrachloride or ethylene trifluoride and additionally $CO_2$ gas to improve high temperature storage characteristics. For solid/gel or polymer electrolytes PVDF, PVDF-HFP, EMITFSI, LiTFSI, PEO, PAN, PMMA, PVC, any blends of these polymers, can be used along with other electrolyte components to provide a gel electrolyte. Electrolyte suppliers include Cheil, Ube, Mitsubishi Chemical, BASF, Tomiyama, Guotsa-Huasong, and Novolyte.

Further Examples and Comparative Examples

A set of described hypothetical experiments and methodology on how to implement the present disclosure, with resulting data from performance model results, are given below:

EXAMPLE 2

An anode paste with a solid composition of artificial graphite/conductive carbon/PVDF binder weight ratio of 95%/1%/4% is coated on both sides of a 10 μm thick Cu foil. The paste media solvent is NMP. The Cu foil width is 82 mm. The coating width is 80 mm, which leaves a 2 mm non-coated area at one edge of the foil. After coating the electrode is heated a 150° C. for 5 minutes to remove solvent. The dried electrode is pressed to achieve a pressed electrode density of 1.55 g/cc.

A cathode paste with a solid composition of $LiNi_{0.5}Co_{0.2}Mn_{0.3}O_2$/conductive carbon/PVDF binder weight ratio of 94%/3%/3% is coated on both sides of a 20 μm thick Al foil. The paste media solvent is NMP. The Al foil width is 82 mm. The coating width is 80 mm, which leaves a 2 mm non-coated area at one edge of the foil. After coating the electrode is heated a 150° C. for 5 minutes to remove solvent. The dried electrode is pressed to achieve a pressed electrode density of 3.55 g/cc. The 1st cycle charge capacity ratio of anode and cathode is 1.12. The cathode thickness with Al foil is approximately 166 μm, and anode thickness with Cu foil is approximately 196 μm.

Figure 15B:
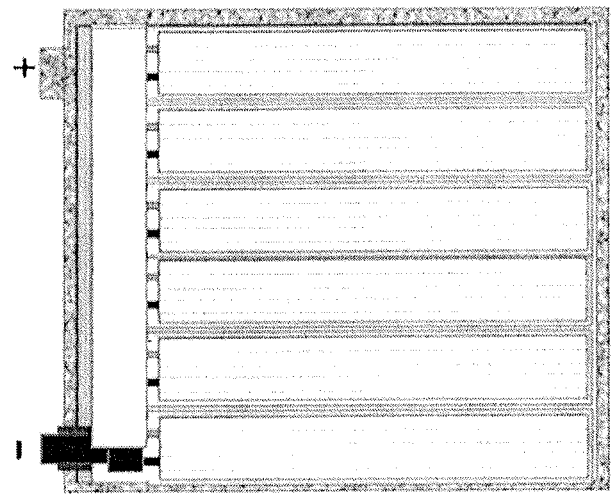
FIG. 15B is a perspective cross-sectional view of a multi-core Li-ion assembly as described in Comparative Example 2.

A 25 μm thick polyethylene separator was inserted between the cathode and anode. The width of separator is 82 mm. The separator covers both cathode and anode coating areas and extended 1 mm to cover Cu non-coated area and Al non-coated area respectively. The cathode and anode coated areas precisely face each other (FIGS. 15 & 16). The electrode and separator laminate is wound in a winding machine to form a jelly roll with the roll height of 84 mm and diameter of 23 mm.

Six jelly rolls are arranged in a row with a gap between each individual neighboring jelly rolls of 1 mm. The ends of Cu non-coated area are welded on a Cu NBB with a length of 144 mm, width of 23 mm and thickness of 2 mm using a laser welder. There are six 22.5 mm wide slit openings in the Cu NBB. The center of each slit opening is corresponding to the center of jelly roll. Five 1 mm thick polypropylene plates with a length of 84 mm and width 23.5 mm is inserted into gaps between jelly rolls. This semi-assembly is then inserted into an Al sleeve with Al thickness of 1 mm. The sleeve has a length of 148 mm, width of 26.5 mm and height of 87 mm. The Al non-coated ends of jelly rolls are weld on an Al PBB by a laser welder. The Al PBB has a length of 148 mm, width of 26.5 mm. The Al PBB is welded on the bottom of the Al sleeve to ensure a hermitical sealing. Two polypropylene plates with height of 89 mm and width of 24.5 mm are inserted between the end jelly rolls and the two narrow Al case walls. Two 0.5 mm thick polypropylene sheets with a length of 144 mm and width of 87 mm are inserted between jelly rolls and the two wide Al case walls.

Figure 15A:
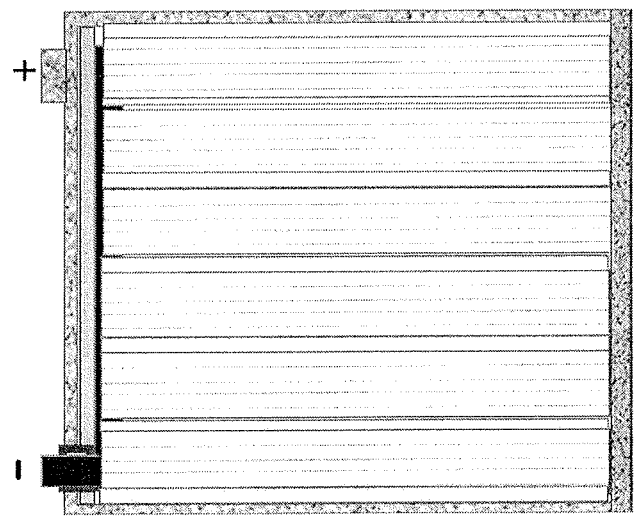
FIG. 15A is a perspective cross-sectional view of a multi-core Li-ion assembly as described in Example 2.

A 5 mm diameter Cu rod is welded on Cu NBB as negative terminal. A polypropylene board with 144 mm in length and 23.5 mm in width is place between the top cover and Cu NBB. There are six 2 mm diameter holes corresponding to the slit openings in the Cu NBB in this board. The top Al cover, with a thickness of 1 mm, is welded on the Al sleeve by a laser welder to ensure hermitical sealing. There are electrolyte filling holes and vent arranged in the top cover (FIG. 15A). An EC/DMC/EMC (1:1:1)-$LiPF_6$ 1 M based electrolyte is filled into the jelly rolls using vacuum filling method.

The multi-core Li-ion assembly is initially charged to 4.1V for formation with 3 A constant current. After formation, the holes in the top cover are sealed by metal balls of similar size. The multi-core Li-ion assembly is charged to 4.2V with 6 A constant current, followed constant voltage charging at 4.2V till the current reached 0.6 A. The discharge capacity is determined by a constant current discharge to 2.75V. The test result modeled from this type of method is listed in Table 13. It can be seen that the multi-core Li-ion assembly in Example 1 has higher capacity, higher energy and higher volumetric and gravimetric energy density than the Comparative Example 2.

COMPARATIVE EXAMPLE 2

The cathode and anode formulation, Al and Cu foil thickness, electrode fabrication process, separator, and jelly fabrication process are the same as in Example 2. In Comparable 1, the Al foil width is 72 mm and cathode coated area width is 72.5 mm. The Cu foil with is 74.5 mm and the coated area with is also 74.5 mm. The separator width is 76.5 mm. The cathode and anode press densities are 3.55 g/cc and 1.55 g/cc respectively. The 1st cycle charge capacity ratio of anode and cathode is 1.16. The cathode thickness with Al foil is approximately 166 μm, and anode thickness with Cu foil is approximately 209 μm. The jelly roll has a height of 76.5 mm and diameter of 23 mm. The jelly roll has two tabs—Al for the cathode and Cu for the anode. The tabs have the same thickness as Al collector foil and Cu current collector foil respectively, and have a length of 78.5 mm and width of 5 mm. The length of both tabs above the jelly roll is 2 mm.

Figure 16B:
FIG. 16B is a perspective cross-sectional view of a single core Li-ion assembly as described in Comparative Example 3.

Six jelly rolls were inserted into six polypropylene liners with cavity diameter of 23 mm, height of 78.5 mm and wall thickness of 0.5 mm. This assembly was then inserted into an Al case with length of 148 mm, height of 90 mm, width of 26.5 mm and wall thickness of 1 mm. The Al busbar has a length of 130 mm, width of 10 mm and thickness of 9 mm. And the Cu busbar has a length of 130 mm, width of 10 mm and thickness of 5 mm. The Al tabs of jelly rolls are welded onto the Al busbar and the Cu tabs are welded onto the Cu busbar using a laser welder (FIG. 16B). Al and Cu busbars is positioned on polypropylene liner and between them a piece of propylene block is placed to insulate the bus bars. A polypropylene board with six 2 mm holes corresponding to each individual jelly rolls and having a thickness of 1 mm and length of 146 mm and width of 24.5 mm is placed between the busbars and the top cover of case. The top cover with a vent and six electrolyte filling holes is hermetically welded. An electrolyte that is same as to Example 2 is filled into jelly rolls by vacuum filling method.

The multi-core Li-ion assembly is initially charged to 4.1V for formation with 3 A constant current. After formation, the holes in the top cover are sealed by metal balls. The multi-core Li-lion assembly is charged to 4.2V with 6 A constant current, followed constant voltage charging at 4.2V till the current reaches 0.6 A. The discharge capacity is determined by a constant current discharge to 2.75V. The test results from the model is listed in Table 13.

TABLE 13

|  | Example 2 | Comparable 2 | Example 3 | Comparable 3 |
|---|---|---|---|---|
| Unit capacity (Ah) | 34.85 | 33.48 | 5.207 | 5.036 |
| Unit energy (Wh) | 125.5 | 120.5 | 18.7 | 18.1 |
| Unit weight (g) | 730.1 | 725.9 | 87.8 | 86.2 |
| Unit volume (mL) | 356.9 | 356.9 | 40.1 | 40.1 |
| Energy density (Wh/kg) | 171.8 | 166.0 | 213.4 | 210.3 |
| Energy density (Wh/L) | 351.6 | 337.7 | 467.9 | 452.6 |

EXAMPLE 3

The jelly roll in Example 3 is the same as in Example 2, except for the following differences: (i) the cathode Al foil width is 63 mm and the coated area width is 61 mm; (ii) the anode Cu foil width is also 63 mm and the coated area with is 61 mm; (iii) the separator width is 63 mm; and (iv) the jelly roll height is 65 mm and diameter is 24.8 mm.

Figure 16A:
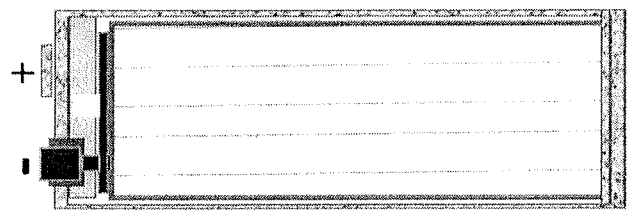
FIG. 16A is a perspective cross-sectional view of a single core Li-ion assembly as described in Example 3.

A Cu disc, NBB, with diameter of 24.8 mm and thickness of 0.5 mm was welded onto the Cu non-coated end of jelly roll using a laser welder. A 24 mm slit opening is Cu disc. An Al disc, PBB, with diameter of 27 mm and thickness of 1 mm is welded onto the Al non-coated end of jelly roll using a laser welder. The assembly is inserted into an Al sleeve with a diameter of 27 mm, height of 69 mm and wall thickness of 1 mm. The PBB is welded onto the bottom Al sleeve using a laser welder. The NBB is welded onto the negative terminal on the top cover of the Al sleeve. A polypropylene disc with diameter of 25 mm, thickness of 1 mm and a 2 mm hole in the center is placed between the top cover and NBB. A 1 mm thick Al top cover having an electrolyte filing hole and vent is welded onto the Al sleeve to ensure hermetical sealing. The same electrolyte in Example 2 is vacuum filled into the jelly roll (FIG. 16A).

The single core Li-ion cell is initially charged to 4.1V for formation with 0.5 A constant current. After formation, the hole in the top cover is sealed by a metal ball. Charging to 4.2V with 1 A constant current, followed by constant voltage charging at 4.2V till the current reaches 0.1 A. The discharge capacity is determined by a constant current discharge to 2.75V. The test results from the model are listed in Table 13. Example 3 has higher capacity, higher energy and higher volumetric and gravimetric energy density than the Comparative Example 3.

COMPARATIVE EXAMPLE 3

The jelly roll in Comparative Example 3 is same as to Comparative Example 2, except for the following differences: (i) the cathode Al foil width is 60 mm and the coated area width is 60 mm; (ii) the anode Cu foil width is also 62 mm and the coated area with is 62 mm; (iii) the separator width is 64 mm; (iv) the jelly roll height is 64 mm and diameter is 24.8 mm; and (v) the Al tab and the Cu tab have a length of 64 mm and width of 5 mm. The length of both tabs above the jelly roll is 3 mm.

The jelly roll is inserted into an Al can with height of 69 mm, diameter of 27 mm and wall thickness of 1 mm. A polypropylene disc with diameter of 25 mm, thickness of 1 mm and a 2 mm hole in the center is placed between the top cover and jelly roll. Both Cu and Al tabs are welded onto the negative and positive terminals on the top cover. A 1 mm thick Al top cover having an electrolyte filing hole and vent was welded onto the Al can to ensure hermitical sealing. The same electrolyte in Example 2 was vacuum filled into the jelly roll (FIG. 16B)

The single core Li-ion cell is initially charged to 4.1V for formation with 0.5 A constant current. After formation, the hole in the top cover is sealed by a metal ball. Charging to 4.2V with 1 A constant current followed by constant voltage charging at 4.2V till the current reached 0.1 A. The discharge capacity is determined by a constant current discharge to 2.75V. The test results are listed in Table 13.

\* \* \*

As will be readily apparent to persons skilled in the art, the present disclosure may be embodied in other specific forms without departing from the spirit or essential characteristics thereof. The present embodiments are therefore to be considered in all respects as illustrative and not restrictive.

The invention claimed is:

1. A multi-core lithium ion battery, comprising:
a sealed enclosure, including a lithium ion cell region and a shared atmosphere region in the interior of the enclosure;
a support member disposed within the lithium ion cell region of the sealed enclosure, the support member including a plurality of cavities, each cavity having an end open to the shared atmosphere region;
a plurality of lithium ion core members, each core member having an anode and a cathode that (i) are exposed to the shared atmosphere region through an open end of the core member and (ii) communicate with the shared atmosphere region by way of the open end of the cavity, wherein each of the core members is disposed within a corresponding one of the plurality of cavities, wherein said core members are substantially surrounded by a cavity wall along their lengths; and
one or more endothermic materials positioned in proximity to the lithium ion cell region.

2. The lithium ion battery of claim 1, wherein at least one of the one or more endothermic materials is included within a ceramic matrix.

3. The lithium ion battery of claim 1, wherein the one or more endothermic materials is capable of providing thermal insulation properties at and above an upper normal operating temperature associated with the proximate one or more lithium ion core members.

4. The lithium ion battery of claim 3, wherein the one or more endothermic materials is selected to undergo one or more endothermic reactions between the upper normal operating temperature and a higher threshold temperature above which the lithium ion core member is liable to thermal runaway.

5. The lithium ion battery of claim 1, wherein an endothermic reaction associated with at least one of the one or more endothermic materials results in evolution of gas.

6. The lithium ion battery of claim 5, wherein at least one of the one or more endothermic materials is included within a ceramic matrix, and wherein the ceramic matrix has sufficient porosity to permit said gas to vent and thereby remove heat therefrom.

7. The lithium ion battery of claim 2, wherein the ratio of ceramic matrix to endothermic material is in the range 1:9 to 9:1 by weight.

8. The lithium ion battery of claim 2, wherein the ceramic matrix comprises one or more inorganic fibers, inorganic particulate materials and binders.

9. The lithium ion battery of claim 8, wherein the inorganic particulate materials are selected from the group consisting of fumed ceramics, opacifiers, and mixtures thereof.

10. The lithium ion battery of claim 2, wherein the ceramic mixture comprises 0-60 wt % ceramic oxide powder, 0-30 wt % opacifier, 10-90 wt % endothermic materials, 0-10 wt % dry binder, 0-60 wt % liquid binder, and 0-60 wt % fiber.

11. The lithium ion battery of claim 2, wherein the ceramic matrix defines a gradient of the one or more endothermic materials.

12. The lithium ion battery of claim 2, wherein the ceramic matrix defines a surface region having a higher concentration of the one or more endothermic materials as compared to at least one region within the ceramic matrix.

13. The lithium ion battery of claim 1, wherein the one or more endothermic materials are formed into a shaped body that defines at least one recess configured and dimensioned to receive the support member.

14. The lithium ion battery of claim 13, wherein the shaped body defines a plurality of recesses each configured and dimensioned to receive a support member.

15. The lithium ion battery of claim 2, wherein the one or more endothermic materials are selected from the group consisting of

| Mineral | Chemical Formula | Approximate onset of Decomposition (° C.) |
| --- | --- | --- |
| Nesquehonite | $MgCO_3 \cdot 3H_2O$ | 70-100 |
| Gypsum | $CaSO_4 \cdot 2H_2O$ | 60-130 |
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 | wherein the "approximate onset of decomposition" is the temperature at which an endothermic reaction of the endothermic material is expected to begin.

16. The lithium ion battery of claim 2, wherein the one or more endothermic materials includes sodium bicarbonate.

17. The lithium ion battery of claim 1, wherein the one or more endothermic materials includes a first endothermic material characterized by a first approximate onset temperature for initiation of an endothermic reaction, and a second endothermic material characterized by a second approximate onset temperature for initiation of an endothermic reaction, and wherein the first approximate onset temperature is different than the second approximate onset temperature.

18. The lithium ion battery of claim 1, wherein the sealed enclosure includes at least one vent.

19. The lithium ion battery of claim 18, wherein the at least one vent is actuated in response to the pressure within the sealed enclosure exceeding a predetermined threshold pressure level.

20. The lithium ion battery of claim 18, further comprising a flame arrestor in proximity to the at least one vent.

21. The lithium ion battery of claim 19, wherein the predetermined threshold pressure level is between about 15 psi and 200 psi.

22. The lithium ion battery of claim 1, wherein the one or more endothermic materials is selected from the group consisting of materials that include hydroxyl components, hydrous components, hydroxyl or hydrous components in combination with at least one carbonate, hydroxyl or hydrous components in combination with at least one sulphate, non-hydrous carbonates, non-hydrous sulphates, non-hydrous phosphates and combinations thereof.

* * * * *